United States Patent
Komatsu et al.

(10) Patent No.: US 9,242,380 B2
(45) Date of Patent: Jan. 26, 2016

(54) ROBOT, ROBOT CONTROL APPARATUS, ROBOT CONTROL METHOD, AND ROBOT CONTROL PROGRAM

(71) Applicant: Panasonic Intellectual Property Management Co., Ltd., Osaka (JP)

(72) Inventors: Mayumi Komatsu, Kyoto (JP); Yasunao Okazaki, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/551,519

(22) Filed: Nov. 24, 2014

(65) Prior Publication Data

US 2015/0081099 A1 Mar. 19, 2015

Related U.S. Application Data

(63) Continuation of application No. PCT/JP2014/000353, filed on Jan. 24, 2014.

(30) Foreign Application Priority Data

Feb. 25, 2013 (JP) ................................. 2013-034873

(51) Int. Cl.
*B25J 13/00* (2006.01)
*B25J 13/08* (2006.01)

(52) U.S. Cl.
CPC ..... *B25J 13/085* (2013.01); *G05B 2219/36429* (2013.01); *G05B 2219/40201* (2013.01); *Y10S 901/09* (2013.01); *Y10S 901/46* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,204,619 B1 * | 3/2001 | Gu | ........................ | B66C 23/005 254/1 |
| 6,216,056 B1 * | 4/2001 | Ito | ............................. | B25J 9/16 700/157 |
| 6,394,731 B1 * | 5/2002 | Konosu | ..................... | B25J 5/04 414/5 |
| 6,522,952 B1 * | 2/2003 | Arai | ..................... | B25J 9/1612 414/591 |
| 7,112,938 B2 * | 9/2006 | Takenaka | ............ | B62D 57/032 318/568.11 |
| 7,443,115 B2 * | 10/2008 | Okamoto | ............... | B25J 9/1612 318/100 |
| 7,558,647 B2 * | 7/2009 | Okazaki | ................. | B25J 9/1633 318/568.14 |
| 7,747,351 B2 * | 6/2010 | Tsusaka | ................. | B25J 9/0003 177/25.11 |

(Continued)

FOREIGN PATENT DOCUMENTS

JP 7-314365 12/1995
JP 10-230489 9/1998

(Continued)

OTHER PUBLICATIONS

International Search Report issued Apr. 28, 2014 in International (PCT) Application No. PCT/JP2014/000353.

(Continued)

*Primary Examiner* — Jonathan L Sample
(74) *Attorney, Agent, or Firm* — Wenderoth, Lind & Ponack, L.L.P.

(57) ABSTRACT

A robot arm temporarily stops when a contact detector detects contact. A holding motion selecting unit then selects one of continuously stopped motion, directionally limited motion, and directionally unlimited motion in accordance with information including one or both of a distance between the robot arm and a contacted object and force applied to the robot arm by a person. A motion controller causes the selected motion to achieve holding motion.

16 Claims, 16 Drawing Sheets

(56) References Cited

U.S. PATENT DOCUMENTS

| | | | | |
|---|---|---|---|---|
| 8,024,071 | B2* | 9/2011 | Komatsu | B25J 9/0003 318/568.22 |
| 8,280,552 | B2 | 10/2012 | Takesue et al. | |
| 8,364,314 | B2* | 1/2013 | Abdallah | H01R 13/17 700/264 |
| 8,396,594 | B2* | 3/2013 | Okazaki | G05B 19/423 318/100 |
| 8,473,094 | B2* | 6/2013 | Becker | B65G 47/914 294/65 |
| 9,020,643 | B2* | 4/2015 | Shimizu | B25J 9/1664 700/245 |
| 9,122,275 | B2* | 9/2015 | Kim | G05D 3/00 |
| 2004/0140787 | A1* | 7/2004 | Okamoto | B25J 13/083 318/568.21 |
| 2004/0186627 | A1* | 9/2004 | Watanabe | G05B 19/402 700/264 |
| 2005/0055132 | A1* | 3/2005 | Matsumoto | B25J 9/1682 700/245 |
| 2005/0166413 | A1* | 8/2005 | Crampton | B25J 13/088 33/503 |
| 2007/0112458 | A1* | 5/2007 | Kondo | B25J 9/026 700/213 |
| 2007/0150105 | A1* | 6/2007 | Orita | B62D 57/032 700/245 |
| 2009/0105880 | A1* | 4/2009 | Okazaki | B25J 9/1633 700/258 |
| 2009/0285664 | A1* | 11/2009 | Kim | B25J 9/1612 414/730 |
| 2010/0004778 | A1* | 1/2010 | Arimatsu | B25J 9/1697 700/214 |
| 2010/0087955 | A1* | 4/2010 | Tsusaka | B25J 9/0003 700/245 |
| 2010/0114371 | A1* | 5/2010 | Tsusaka | B25J 9/0003 700/250 |
| 2010/0152896 | A1* | 6/2010 | Komatsu | B25J 9/0003 700/258 |
| 2010/0216865 | A1* | 8/2010 | Elias | B25J 13/02 514/44 A |
| 2010/0262291 | A1* | 10/2010 | Takesue | B25J 13/02 700/260 |
| 2011/0040411 | A1* | 2/2011 | Murayama | B25J 5/02 700/260 |
| 2011/0193363 | A1* | 8/2011 | Nishiwaki | B25J 13/083 294/86.4 |
| 2012/0123589 | A1* | 5/2012 | Kim | B25J 9/1612 700/254 |
| 2013/0030569 | A1* | 1/2013 | Fudaba | G05B 19/423 700/245 |
| 2013/0178978 | A1* | 7/2013 | Kim | G05D 3/00 700/251 |
| 2013/0184871 | A1* | 7/2013 | Fudaba | B25J 13/02 700/264 |
| 2014/0336820 | A1* | 11/2014 | Fudaba | G06F 3/041 700/261 |
| 2014/0343729 | A1* | 11/2014 | Fudaba | B25J 13/00 700/261 |
| 2015/0081099 | A1* | 3/2015 | Komatsu | B25J 13/085 700/258 |

FOREIGN PATENT DOCUMENTS

| | | |
|---|---|---|
| JP | 2001-191278 | 7/2001 |
| JP | 2005-118959 | 5/2005 |
| JP | 2005-193339 | 7/2005 |
| JP | 2005-194061 | 7/2005 |
| JP | 2009-66696 | 4/2009 |
| JP | 2009-202280 | 9/2009 |
| JP | 4443614 | 3/2010 |

OTHER PUBLICATIONS

International Preliminary Report on Patentability and Written Opinion of the International Searching Authority (with English translation) mailed Sep. 3, 2015 in International (PCT) Application No. PCT/JP2014/000353.

* cited by examiner

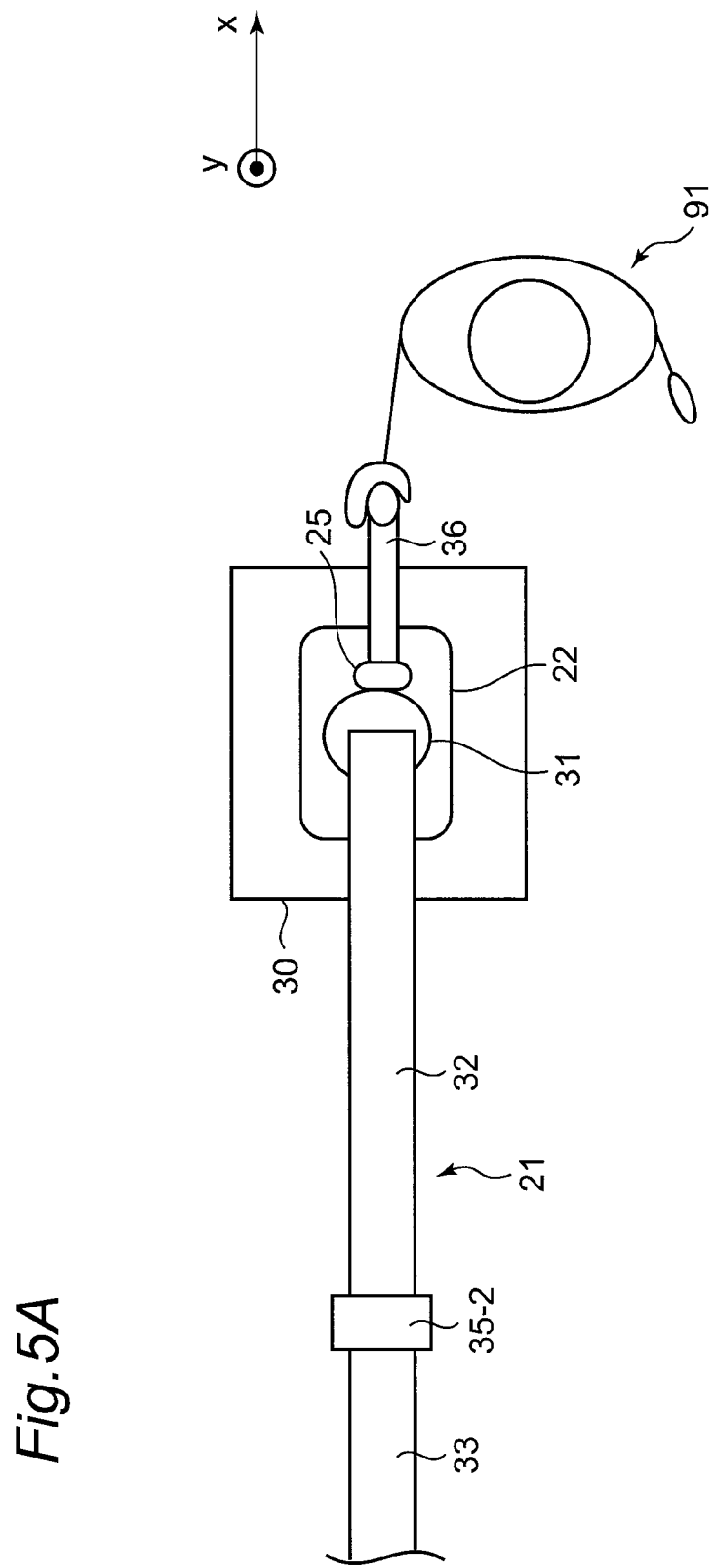

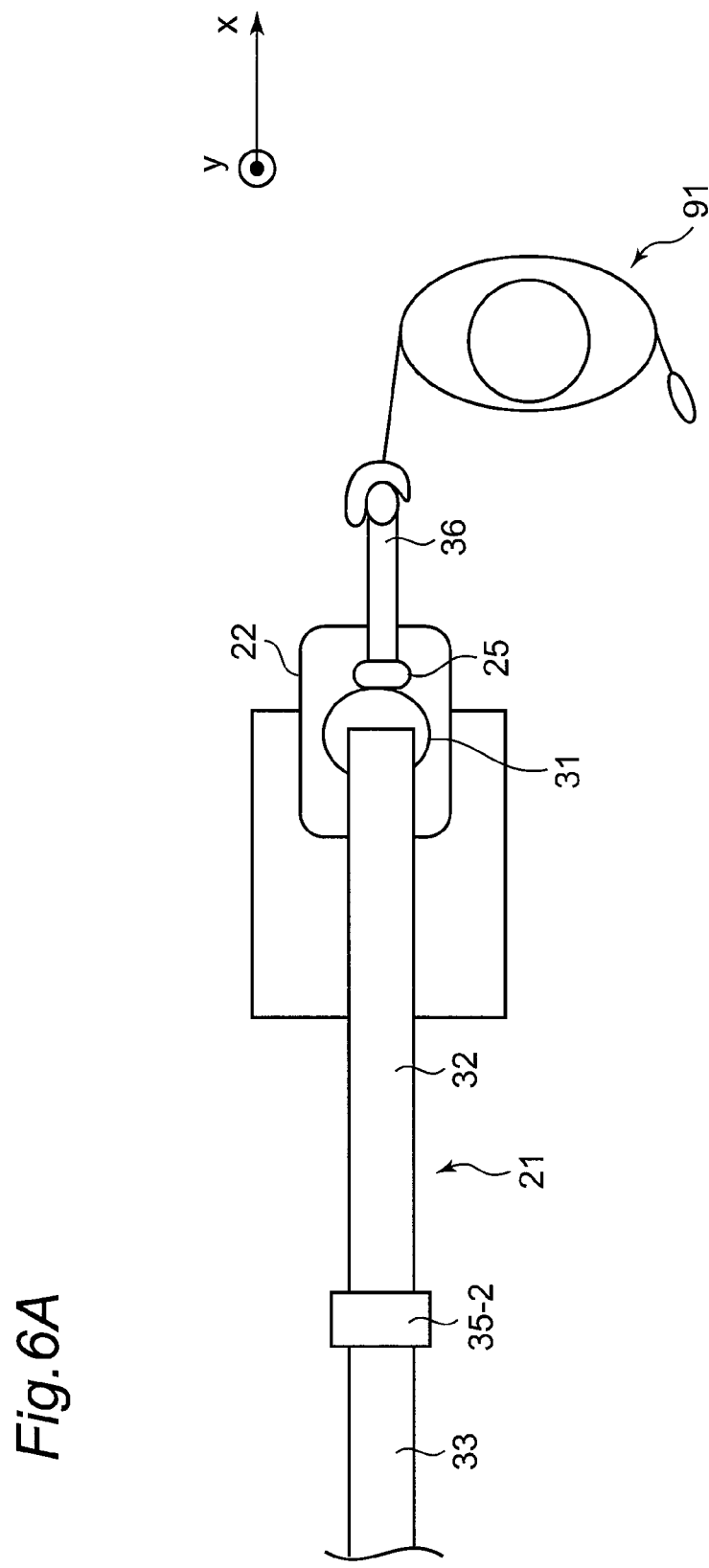

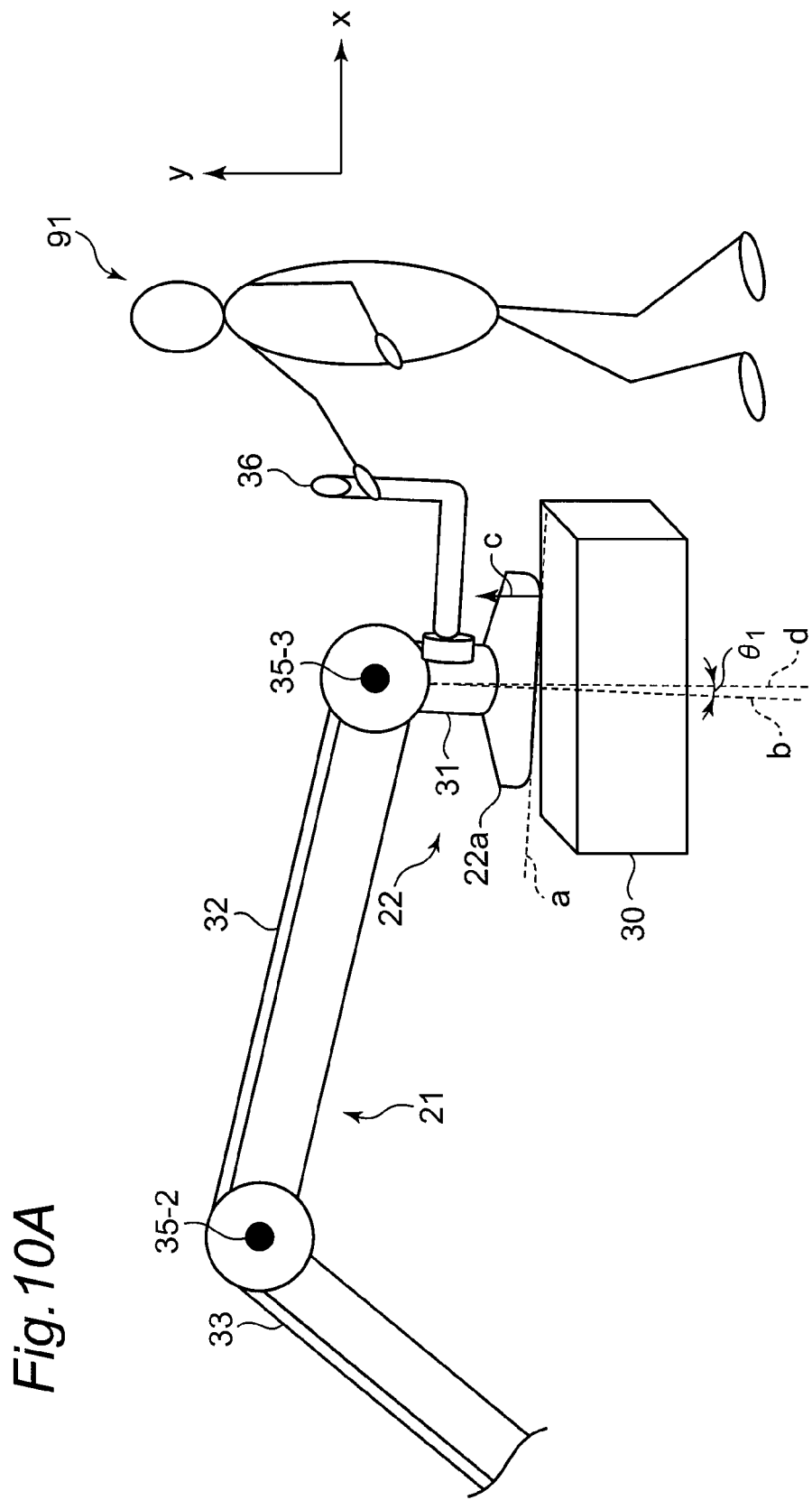

ROBOT, ROBOT CONTROL APPARATUS, ROBOT CONTROL METHOD, AND ROBOT CONTROL PROGRAM

CROSS-REFERENCE TO RELATED APPLICATIONS

This is a continuation application of International Application No. PCT/JP2014/000353, with an international filing date of Jan. 24, 2014, which claims priority of Japanese Patent Application No.: 2013-034873 filed on Feb. 25, 2013, the content of which is incorporated herein by reference.

TECHNICAL FIELD

The technical field present disclosure relates to a robot of a power assisting type for assisting conveyance of an object, a robot control apparatus, a robot control method, and a robot control program for controlling motion of the robot.

BACKGROUND ART

Domestic robots such as nursing care robots and housekeeping support robots have been developed actively in recent years. Industrial robots including a robot cooperating with a person have been also developed actively due to increasing cell production plants and the like. Such an assisting robot cooperating with a person needs to coexist with a person, unlike a conventional robot configured to move in a robot operating area separated from a person staying area. The assisting robot is required to assure safety different from that required for the conventional industrial robots and the like. A power assisting robot for performing a task of conveying an object in cooperation with a person is in one of a state of conveying an object and a state of conveying no object, and needs to be safely switched between these two states. The robot needs to contact to hold an object when being switched from the state of conveying no object to the state of conveying an object. When the power assisting robot is made in contact with an object, a force detector detects force in a direction unintended by a person due to the contact. Upon the detection of force in a direction unintended by a person, the robot may move in an unintended direction or may be hard to be pressed against the object. The conventional assisting robots have such safety problems.

A conventional technique for such a power assisting robot configured to hold an object provides a method of controlling a held object (work) so as to move as desired by directionally limiting motion of an assisting device in accordance with a direction of operation force (Patent Literature 1).

CITATION LIST

Patent Literature

Patent Literature: Japanese Patent No. 4443614

SUMMARY OF THE INVENTION

The technique disclosed in Patent Literature 1 does not define motion for safely contacting to hold the held object and has a safety problem in holding the object. The technique according to Patent Literature 1 requires a predetermined desired trajectory direction for holding the held object. The technique according to Patent Literature 1 is hard to be applied to hold an object with a power assisting robot manipulated by a person who changes the manipulation depending on a condition.

One non-limiting and exemplary embodiment provides a robot, a robot control apparatus, a robot control method, and a robot control program that enable safe manipulation of the robot holding an object and achieve holding of the object.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A robot including a robot arm and configured to convey an object in cooperation with a person, the robot comprising:

a holder provided to the robot arm and configured to hold the object;

a contact detector configured to detect contact between the holder and the object;

a contact condition detector configured to detect a distance between the object and the holder as a contact condition upon contact;

a holding motion selecting unit configured to switch motion of the robot arm upon hold in accordance with the contact condition detected by the contact condition detector; and a motion controller configured to move the robot arm in accordance with force applied to the robot arm by the person, wherein when the contact detector detects the contact, the robot arm temporarily stops and the holding motion selecting unit then selects one of continuously stopped motion, directionally limited motion, and directionally unlimited motion in accordance with information including one or both of the distance between the robot arm and the contacted object and the force applied to the robot arm by the person, and the motion controller causes the selected motion to achieve holding motion.

These general and specific aspects may be implemented using a system, a method, and a computer program, and any combination of systems, methods, and computer programs.

According to this aspect of the present disclosure, the robot configured to convey the object in cooperation with the person can safely hold the object even when the held object is made in contact with the robot arm for holding the object.

BRIEF DESCRIPTION OF THE DRAWINGS

These and other aspects and features of the present disclosure will become clear from the following description taken in conjunction with the embodiments thereof with reference to the accompanying drawings, in which:

FIG. 5A is a plan view showing an example of positional relationship between the robot according to the first embodiment of the present disclosure and a held object;

FIG. 6A is a plan view showing an example of positional relationship between the robot according to the first embodiment of the present disclosure and a held object;

FIG. 10A is a view showing an example of a direction of holding a held object with a robot arm according to the first embodiment of the present disclosure;

DETAILED DESCRIPTION

Figure 1:
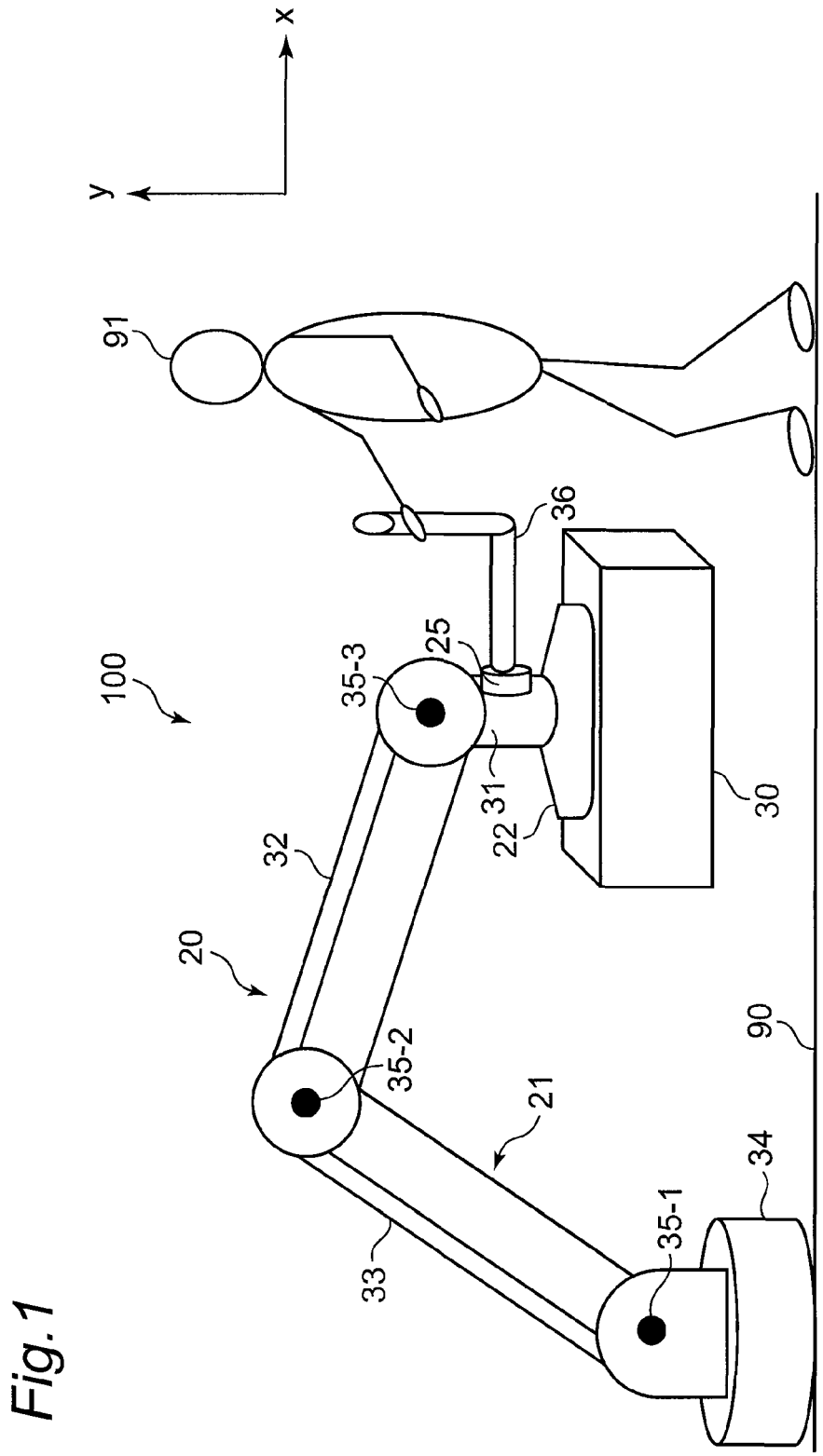
FIG. 1 is a view schematically showing a robot system according to a first embodiment of the present disclosure.

Examples of the disclosed technique are as follows.

1st aspect: A robot including a robot arm and configured to convey an object in cooperation with a person, the robot comprising:

a holder provided to the robot arm and configured to hold the object;

a contact detector configured to detect contact between the holder and the object;

a contact condition detector configured to detect a distance between the object and the holder as a contact condition upon contact;

a holding motion selecting unit configured to switch motion of the robot arm upon hold in accordance with the contact condition detected by the contact condition detector; and a motion controller configured to move the robot arm in accordance with force applied to the robot arm by the person, wherein when the contact detector detects the contact, the robot arm temporarily stops and the holding motion selecting unit then selects one of continuously stopped motion, directionally limited motion, and directionally unlimited motion in accordance with information including one or both of the distance between the robot arm and the contacted object and the force applied to the robot arm by the person, and the motion controller causes the selected motion to achieve holding motion.

According to the above aspect of the present disclosure, the robot configured to convey the object in cooperation with the person can safely hold the object even when the held object is made in contact with the robot arm for holding the object.

2nd aspect: The robot according to the 1st aspect, wherein the contact detector detects a direction of the contact between the robot arm and the object, and only when the direction detected by the contact detector is equal to a direction of holding the object with the robot arm, the holding motion selecting unit selects the directionally limited person associated motion or the directionally unlimited person associated motion in accordance with the information including one or both of the distance between the robot arm and the contacted object and the force applied to the robot arm by the person.

According to this aspect of the present disclosure, when the robot arm is made in contact with the object and the person causes the contact in order to achieve hold, the robot arm can move smoothly to safely hold the object with no disturbance by the motion selected by the holding motion selecting unit. Even when the person shifts the robot arm in the direction of holding the object to correct a displaced position of the holder relative to the object, the robot arm can move smoothly to safely hold the object with no disturbance by the motion selected by the holding motion selecting unit.

3rd aspect: The robot according to the 1st or 2nd aspect, wherein the contact detector detects a direction of the force applied to the robot arm by the person, and the holding motion selecting unit selects the directionally limited motion when the direction detected by the contact detector is equal to an approaching direction in last approaching motion of the holder holding the object, and the holding motion selecting unit selects the directionally unlimited motion when the direction detected by the contact detector is not equal to the approaching direction in the last approaching motion of the holder holding the object.

According to this aspect of the present disclosure, even when the contact detector detects force in a direction unintended by the person due to contact with the object in order to achieve holding of the object, the motion direction is limited to the direction of approaching the object and the approaching motion can be achieved stably, so that the holder can reliably hold the object to be held. Furthermore, even when the person shifts the robot arm in the direction of holding the object as well as applies force in a different direction to correct a displaced position of the holder such as the hand relative to the object, the robot arm can move smoothly to safely hold the object with no disturbance by the motion selected by the holding motion selecting unit.

4th aspect: The robot according to any one of the 1st to 3rd aspects, wherein, the holding motion selecting unit selects the directionally limited motion when the distance between the object and the holder detected by the contact condition detector is less than a threshold value, and the holding motion selecting unit selects the directionally unlimited motion when the distance between the object and the holder detected by the contact condition detector is equal to or more than the threshold value.

According to this aspect of the present disclosure, when the robot arm is located close to the object to be held and the last approaching motion enables the holder to reliably hold the object to be held (when the distance between the object and the holder is less than the threshold value), even if the contact detector detects force in a direction unintended by the person due to contact with the object in order to achieve holding of the object, the motion direction is limited to the direction of approaching the object. The approaching motion can be achieved stably and the holder can reliably hold the object to be held. When the robot arm is not close to the object to be held (when the distance between the object and the holder is equal to or more than the threshold value), the position of the robot arm can be modified in any direction, so that the holder can reliably hold the object to be held.

5th aspect: The robot according to any one of the 1st to 4th aspects, wherein the holder is a hand including a suction pad.

According to this aspect of the present disclosure, when the suction pad is made in contact with the object to be held in order to hold the object, simple contact is insufficient for causing necessary suction pressure and the suction pad may often need to be slightly pressed against the object. Also in such a case, the robot arm temporarily stops when the contact detector detects contact between the object and the holder of the robot arm. The holding motion selecting unit then appropriately selects one of the continuously stopped motion, the directionally limited motion, and the directionally unlimited motion in accordance with the information including one or both of the distance between the robot arm and the contacted object and the force applied to the robot arm by the person. The motion controller causes the selected motion so that the holder can reliably hold the object to be held.

6th aspect: The robot according to any one of the 1st to 5th aspects, wherein the robot arm has an elastic configuration.

According to this aspect of the present disclosure, particularly in the case where the robot arm has the elastic configuration, when the person applies force to the robot arm, the robot arm is actually located slightly in front of an original position of the robot arm. When a hand of the person releases the robot arm, the robot arm tends to return to the original position. Also in such a case, the robot arm temporarily stops when the contact detector detects contact between the object and the robot arm. The holding motion selecting unit then appropriately selects one of the continuously stopped motion, the directionally limited motion, and the directionally unlimited motion in accordance with the information including one or both of the distance between the robot arm and the contacted object and the force applied to the robot arm by the person. The motion controller causes the selected motion so that the holder can reliably hold the object to be held.

7th aspect: The robot according to any one of the 1st to 5th aspects, wherein the robot arm is an actuator including a pneumatic artificial muscle.

According to this aspect of the present disclosure, when the robot is the actuator having the pneumatic artificial muscle, the robot achieves effects similar to those of the fifth aspect due to its elastic configuration.

8th aspect: The robot according to any one of the 1st to 7th aspects, wherein, when the holding motion selecting unit selects the directionally limited motion, the holder moves only in an approaching direction in last approaching motion of the holder holding the object.

According to this aspect of the present disclosure, even when the contact detector detects force in a direction unintended by the person due to contact with the object in order to achieve holding of the object, the motion direction of the robot arm is limited to the direction of approaching the object. The approaching motion can be achieved stably and the holder can reliably hold the object to be held.

9th aspect: The robot according to the 2nd aspect, wherein the holding motion selecting unit determines that the robot arm is in the direction of holding the object when an angle between a direction perpendicular to a face of the holder of the robot arm facing the object and the direction detected by the contact detector is less than a threshold value in accordance with the contact condition detected by the contact condition detector and the direction detected by the contact detector.

According to this aspect of the present disclosure, when the robot arm comes in contact with the object so as to hold the object and relative relationship between the holder and the object is within a holdable range, even though the surface of the holder not completely facing the object cannot be brought into contact with the object, the direction can be detected as a holdable direction. Even though the person performs incomplete behavior upon contact, the approaching motion can be achieved stably and the holder can reliably hold the object to be held.

10th aspect: The robot according to the 3rd aspect, wherein the holding motion selecting unit determines that the direction of the force applied to the robot arm by the person is equal to the approaching direction in the last approaching motion when a surface of the object facing the holder and a surface of the holder facing the object are approaching while an angle between a direction in which a point closest to the surface of the object facing the holder in the surface of the holder facing the object and the surface of the object facing the holder have a shortest distance and a perpendicular line to the surface of the holder facing the object is kept smaller than a threshold value, in accordance with the contact condition detected by the contact condition detector and the direction detected by the contact detector.

According to this aspect of the present disclosure, even when the person moves the robot arm in a direction slightly different from the approaching direction in order to cause the robot arm to approach and hold the object, the direction can be detected as a holdable direction as long as the direction achieves hold. The approaching motion can be achieved stably and the holder can reliably hold the object to be held.

11th aspect: The robot according to the 1st to 10th aspects, wherein, when the holding motion selecting unit selects the directionally unlimited motion, the robot arm moves in every movable direction.

According to this aspect of the present disclosure, the directionally unlimited motion is selected when the object to be held and the holder of the robot arm do not have positional relationship allowing hold even if the holder shifts in the direction of approaching the object. The position of the robot arm can thus be modified in any direction, and the holder can reliably hold the object to be held.

12th aspect: A control apparatus for a robot including a robot arm and configured to convey an object in cooperation with a person, the control apparatus comprising:

a contact detector configured to detect contact between a holder provided to the robot arm and the object when the holder holds the object;

a contact condition detector configured to detect a distance between the object and the holder as a contact condition upon contact;

a holding motion selecting unit configured to switch motion of the robot arm upon hold in accordance with the contact condition detected by the contact condition detector; and a motion controller configured to move the robot arm in accordance with force applied to the robot arm by the person, wherein when the contact detector detects the contact, the robot arm temporarily stops and the holding motion selecting unit then selects one of continuously stopped motion, person associated motion with directional limitation, and person associated motion with no directional limitation in accordance with information including one or both of the distance between the robot arm and the contacted object and the force applied to the robot arm by the person, and the motion controller causes the selected motion to achieve holding motion.

According to the above aspect of the present disclosure, the robot configured to convey the object in cooperation with the person can safely hold the object even when the held object is made in contact with the robot arm for holding the object.

13rd aspect: A method of controlling a robot including a robot arm and configured to convey an object in cooperation with a person, the method comprising:

detecting, with a contact detector, contact between a holder provided to the robot arm and the object when the holder holds the object;

detecting, with a contact condition detector, a distance between the object and the holder as a contact condition upon contact;

switching, with a holding motion selecting unit, motion of the robot arm upon hold in accordance with the contact condition detected by the contact condition detector; and moving, with a motion controller, the robot arm in accordance with force applied to the robot arm by the person, wherein when the contact detector detects the contact, the robot arm temporarily stops and the holding motion selecting unit then selects one of continuously stopped motion, person associated motion with directional limitation, and person associated motion with no directional limitation in accordance with information including one or both of the distance between the robot arm and the contacted object and the force applied to the robot arm by the person, and the motion controller causes the selected motion to achieve holding motion.

According to the above aspect of the present disclosure, the robot configured to convey the object in cooperation with the person can safely hold the object even when the held object is made in contact with the robot arm for holding the object.

14th aspect: A computer-readable recording medium including a control program for a robot including a robot arm and configured to convey an object in cooperation with a person, the control program causing a computer to function as:

a contact detector configured to detect contact between a holder provided to the robot arm and the object when the holder holds the object;

a contact condition detector configured to detect a distance between the object and the holder as a contact condition upon contact;

a holding motion selecting unit configured to switch motion of the robot arm upon hold in accordance with the contact condition detected by the contact condition detector; and a motion controller configured to move the robot arm in accordance with force applied to the robot arm by the person, wherein the control program causes the computer to function such that, when the contact detector detects the contact, the robot arm temporarily stops and the holding motion selecting unit then selects one of continuously stopped motion, person associated motion with directional limitation, and person associated motion with no directional limitation in accordance with information including one or both of the distance between the robot arm and the contacted object and the force applied to the robot arm by the person, and the motion controller causes the selected motion to achieve holding motion.

According to the above aspect of the present disclosure, the robot configured to convey the object in cooperation with the person can safely hold the object even when the held object is made in contact with the robot arm for holding the object.

First Embodiment

FIG. 1 is a view schematically showing a robot system 100 according to the first embodiment of the present disclosure.

The robot system 100 includes a robot 20 that has a robot arm 21 and a handle 36 in an L shape. When the robot arm 21 is manipulated by a person 91 holding the handle 36, the robot arm 21 can move and convey an object 30 in cooperation with the person 91. The robot arm 21 has the distal end provided with a hand 22 functioning as an example of a holder so that the hand 22 holds and conveys the object 30. When the person 91 manipulates the robot arm 21 to convey the object 30, the robot 20 functions as an object conveyance assisting arm.

Figure 2:
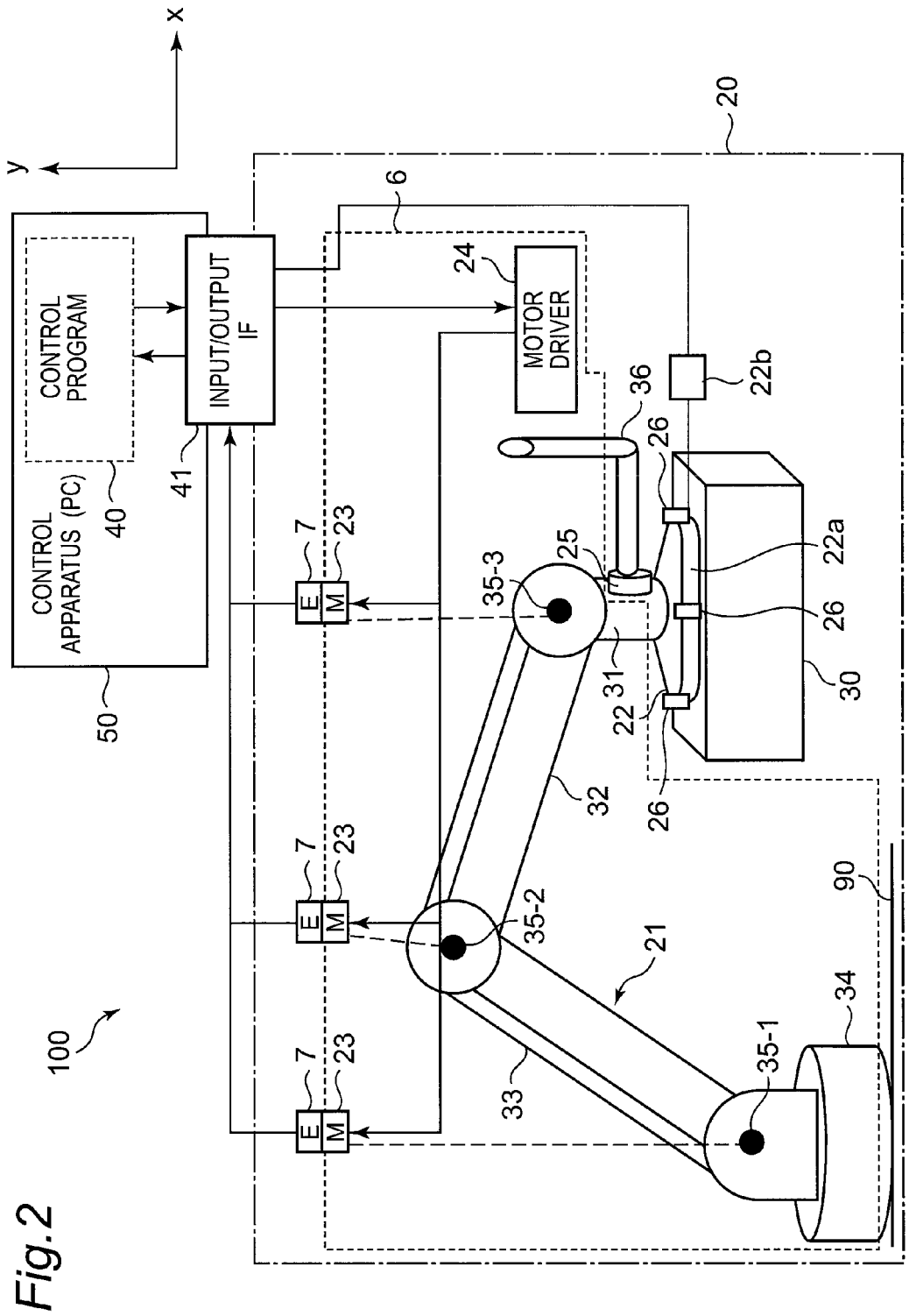
FIG. 2 is a view showing a configuration of the robot system according to the first embodiment of the present disclosure.

FIG. 2 is a view showing the configuration of the robot system 100 according to the first embodiment of the present disclosure.

The robot system 100 includes a control apparatus 50 and the robot 20 to be controlled.

The control apparatus 50 exemplified in the first embodiment is configured by an ordinary personal computer, and includes a control program 40 and an input/output IF 41. The input/output IF (interface) 41 includes a D/A board, an A/D board, a counter board, etc., each of which is connected to an expansion slot of a PCI bus or the like of the personal computer.

The control apparatus 50 is connected to a motor driver 24 for driving each link manipulator of a robot mechanism 6 through the input/output IF 41 exemplifying an input unit, and transmits a control signal to the motor driver 24.

The robot 20 includes the robot arm 21 as described above. The configuration of the robot arm 21 is described later.

When the control apparatus 50 for controlling motion of the robot arm 21 operates to detect joint angle information outputted from an encoder 7 to be described later at each of joints of the robot arm 21, the control apparatus 50 receives the information through the counter board of the input/output IF 41. The control apparatus 50 calculates a control command value for rotating motion at each of the joints from the corresponding joint angle information thus received. Each of the control command values thus calculated is provided to the motor driver 24 for drive controlling the corresponding joint of the robot arm 21 through the D/A board of the input/output IF 41. Each of the joints of the robot arm 21 has a motor 23 that is driven in accordance with the corresponding control command value transmitted from the motor driver 24. The motor driver 24 and the motors 23 function as an example of a drive unit. The encoder 7 functions as an example of an angle detector for outputting angle information.

The robot arm 21 is exemplified by a multiple link manipulator of three degrees of freedom and has the distal end to which the hand 22 can be attached. The robot arm 21 includes a third link 31, a second link 32, a first link 33, and a pedestal 34. The hand 22 is attached to the third link 31. The third link 31 is attached to the distal end of the second link 32. The first link 33 has the distal end rotatably coupled to the proximal end of the second link 32. The first link 33 has the proximal end rotatably coupled to and supported by the pedestal 34 that is fixed to a floor 90. The handle 36, which is gripped and manipulated by the person 91, is attached to the distal end of the third link 31 with a force sensor 25 as a type of the force detector being interposed therebetween.

The robot arm 21 has a first joint shaft 35-1, a second joint shaft 35-2, and a third joint shaft 35-3. The first joint shaft 35-1 rotates positively or negatively within an xy plane that includes an x axis and a y axis provided perpendicularly to each other. The second joint shaft 35-2 and the third joint shaft 35-3 also rotate positively or negatively within the xy plane. The first joint shaft 35-1, the second joint shaft 35-2, and the third joint shaft 35-3 serve as rotary shafts of first, second, and third joints of the robot arm 21, respectively. The robot arm 21 thus configures the multiple link manipulator of three degrees of freedom, which is rotatable independently about the three shafts in total, namely, the first to third joint shafts 35-1 to 35-3.

The joints configuring rotary units of the shafts each include a corresponding one of the motors 23 and a corresponding one of the encoders 7. The motor 23 (actually located inside the corresponding joint of the robot arm 21) is provided to a first one of a pair of members (e.g. a rotating member and a supporting member supporting the rotating member) configuring the corresponding joint and exemplifies a rotation driving device that is drive-controlled by the motor driver 24 to be described later. The encoder 7 (actually located inside the corresponding joint of the robot arm 21) detects a rotation phase angle (i.e. a joint angle) of a rotary shaft of the corresponding motor 23. When the rotary shaft of the motor 23 provided to the first one of the members configuring the corresponding joint is coupled to a second one of the members of the joint and is rotated positively or negatively, the second member is made rotatable about the corresponding shaft relatively to the first member.

Figure 3:
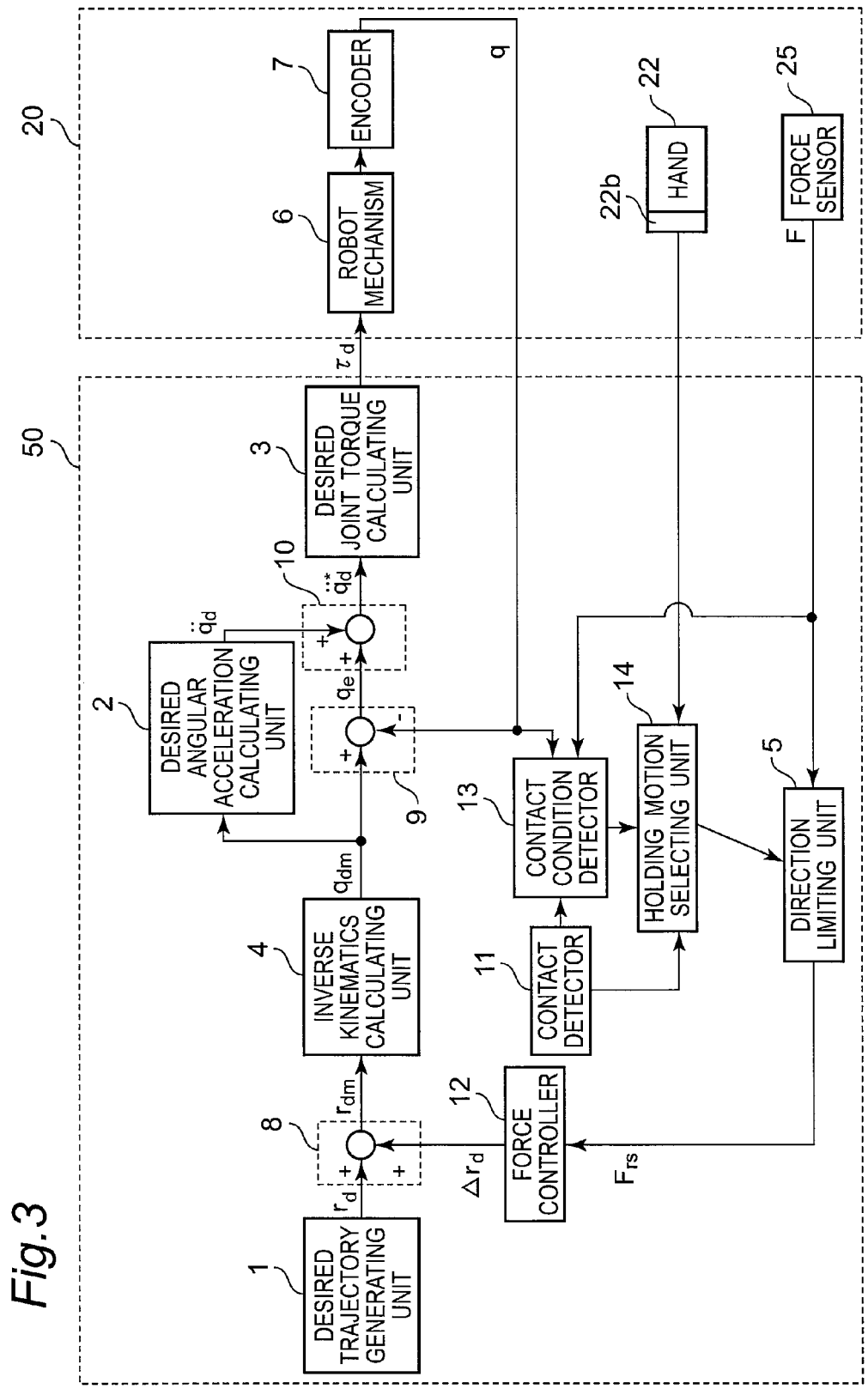
FIG. 3 is a block diagram partially showing a robot control apparatus and a robot to be controlled, according to the first embodiment of the present disclosure.

FIG. 3 is a block diagram partially showing the control apparatus 50 for the robot 20 and the robot 20 to be controlled, according to the first embodiment of the present disclosure.

The control apparatus 50 for the robot 20 at least includes a contact detector (contact detecting unit) 11, a contact condition detector (contact condition detecting unit) 13, a holding motion selecting unit 14, and a force controller 12. The contact detector 11 detects contact between the hand 22 and the object 30. The contact condition detector 13 detects, as an example of a contact condition upon contact, a distance between the object 30 and the robot 20 (hand 22). The holding motion selecting unit 14 switches motion of the robot arm holding the object in accordance with the contact condition detected by the contact condition detector 13. The force controller 12 moves the robot arm 21 in accordance with force applied to the robot arm 21 by the person 91. The robot arm 21 temporarily stops when the contact detector 11 detects contact. The holding motion selecting unit 14 then selects one of continuously stopped motion, directionally limited motion, and directionally unlimited motion in accordance with information including one or both of the distance between the robot arm 21 and the contacted object 30 and the force applied to the robot arm 21 by the person 91. The force controller 12 causes the selected motion to achieve holding motion.

More specifically, the control apparatus 50 includes a desired trajectory generating unit 1, a desired position adding unit 8, a direction limiting unit 5, an inverse kinematics calculating unit 4, a desired angular acceleration calculating unit 2, a desired joint torque calculating unit 3, an output error calculating unit 9, a modified desired angular acceleration calculating unit 10, the force controller 12, the contact detector 11, the contact condition detector 13, and the holding motion selecting unit 14. The robot 20 includes the robot mechanism 6 provided with the robot arm 21, the encoders 7, the force sensor 25, and the hand 22. The control apparatus 50 receives joint angle measurement information acquired by the encoders 7 from the robot 20, information on force (a force vector F) measured by the force sensor 25 exemplifying the force detector and applied to the handle 22 by the person, and information on whether or not the hand 22 holds an object.

The desired trajectory generating unit 1 transmits, to the desired position adding unit 8, a desired position vector $r_d$ required for achieving desired motion of the robot 20. As to the desired motion of the robot 20, a storage unit in the desired trajectory generating unit 1 preliminarily stores desired positions $r_{dt} = [r_{dt1}, r_{dt2}]^T$ ($r_{d0}, r_{d1}, r_{d2}, \ldots$) respectively at time points ($t=0, t=t_1, t=t_2, \ldots$) in accordance with a task to be performed. The desired position generating unit 1 interpolates a trajectory between adjacent points by polynomial interpolation in accordance with information on the positions ($r_{d0}, r_{d1}, r_{d2}, \ldots$) respectively at the time points ($t=0, t=t_1, t=t_2, \ldots$) to generate the desired position vector $r_d = [r_{d1}, r_{d2}]^T$.

The desired position adding unit 8 receives the desired position angle vector $r_d$ from the desired trajectory generating unit 1 and a corrected desired position vector $\Delta r_d$ from the force controller 12, calculates a modified desired position vector $r_{dm} = r_d + \Delta r_d$, and transmits the calculated value to the inverse kinematics calculating unit 4.

The force controller 12 functions as an example of a motion controller, by calculating the corrected desired position vector $\Delta r_d$ from directionally limited force information (a directionally limited force vector $F_{rs}$) received from the direction limiting unit 5 and transmitting the calculated value to the desired position adding unit 8. The force controller 12 calculates the corrected desired position vector $\Delta r_d$ by a force control method such as the impedance control method, the compliance control method, or the like. The force sensor 25 as a type of the force detector detects a force applied by the person 91 to the handle 36 that is attached to the robot arm 21. The force controller 12 calculates the corrected desired position vector $\Delta r_d$, from the detected force and outputs the calculated value. The robot arm 21 thus can achieve person associated motion of moving in the direction of the force applied by the person 91.

The direction limiting unit 5 receives the limited direction information from the holding motion selecting unit 14 and the force information (the force vector F) from the force sensor 25, and transmits the directionally limited force vector $F_{rs}$ to the force controller 12. The direction limiting unit 5 outputs information for replacing with zero a limited direction component in the directionally limited force vector $F_{rs}$ in accordance with the limited direction information outputted from the holding motion selecting unit 14 to be described later. The direction limiting unit 5 outputs a value received from the force sensor 25 for an unlimited direction component with no replacement. When stopping motion of the robot mechanism 6, the direction limiting unit 5 outputs information for replacing with zero every direction component in order to limit every direction in accordance with an every direction limitation signal from the holding motion selecting unit 14. In contrast, when freely moving the robot mechanism 6, the direction limiting unit 5 outputs the value received from the force sensor 25 for every direction component with no replacement in order not to limit any direction in accordance with a signal from the holding motion selecting unit 14.

Exemplified below is a case where the information outputted from the holding motion selecting unit 14 relates to an x direction, in other words, motion in the x direction is limited and motion in a y direction is achieved. Force information $F_s$ outputted from the force sensor 25 is a force vector $F_s = [F_{s1}, F_{s2}]^T$ including information in the x direction and information in the y direction. The direction limiting unit 5 replaces with zero a force vector $F_{s1}$ in the x direction to be limited in the force vector $F_s$. The direction limiting unit 5 utilizes a force vector $F_{s2}$ with no replacement because the motion in the y direction is not limited. A directionally limited force vector $F_{rs}=[0, F_{s2}]^T$ is thus calculated, and the direction limiting unit 5 transmits the calculated value to the force controller 12. When the holding motion selecting unit 14 outputs information in the x and y directions, in other words, motion is stopped with limitation to both the x and y directions, the direction limiting unit 5 replaces with zero the force vectors $F_{s1}$ and $F_{s2}$ in the x and y directions to be limited, in the force vector $F_s$. A directionally limited force vector $F_{rs}=[0, 0]^T$ is thus calculated, and the direction limiting unit 5 transmits the calculated value to the force controller 12.

The inverse kinematics calculating unit 4 receives the modified desired position vector $r_{dm}$ from the desired position adding unit 8, calculates a desired angle vector $q_{dm}$ and transmits the calculated value to the desired angular acceleration calculating unit 2 and the output error calculating unit 9. The desired angle vector $q_{dm}$ is calculated from geometry information on the robot 20.

The output error calculating unit 9 receives the desired angle vector $q_{dm}$ from the inverse kinematics calculating unit 41 and an output q from the encoder 7, calculates an angle error vector $q_e=q_{dm}-q$, and transmits the angle error vector $q_e$ exemplifying an output error to the modified desired angular acceleration calculating unit 10.

The desired angular acceleration calculating unit 2 receives the desired angle vector $q_{dm}$ from the inverse kinematics calculating unit 4 and transmits desired angular acceleration
$\ddot{q}_d$
to the modified desired angular acceleration calculating unit 10.

The modified desired angular acceleration calculating unit 10 receives the desired angular acceleration
$\ddot{q}_d$
from the desired angular acceleration calculating unit 2 and the angle error vector $q_e$ from the output error calculating unit 9, and transmits modified desired angular acceleration
$\ddot{q}^*_d$
exemplifying a control command value to the desired joint torque calculating unit 3.

The desired joint torque calculating unit 3 calculates desired joint torque $\tau_d$ from the modified desired angular acceleration
$\ddot{q}_d$
received from the modified desired angular acceleration calculating unit 10 and dynamics parameters preliminarily stored in a storage unit of the desired joint torque calculating unit 3, and transmits the desired joint torque $\tau_d$ to the motor driver 24 of the robot mechanism 6. The desired joint torque $\tau_d$ is exemplarily calculated using the following expression.

$$\tau_d=M(q)\cdot\ddot{q}^*_d+C(q,\dot{q})+g(q)$$

Each of M(q) and $C(q,\dot{q})$
is a coefficient matrix of dynamics parameters of the object 30 and the robot 20.
g(q)
is a gravity term for mass of the object 30 and the robot 20.

The motor driver 24 receives the desired joint torque $\tau_d$ as a torque desired value through the input/output IF 41 such as the D/A board. The motors 23 provided to the respective joint shafts 35 are independently driven to rotate positively or negatively to move the robot arm 21 of the robot mechanism 6.

The robot arm 21 of the robot mechanism 6 moves to change the joint angle of the robot 20. A result of detection by the encoder 7 for detecting a joint angle q is transmitted to the output error calculating unit 9 and the contact condition detector 13 through the input/output IF 41.

The contact detector 11 detects contact of the robot arm 21 with the external object 30 and a contact direction thereof, and transmits a contact detection signal to the contact condition detector 13 and the holding motion selecting unit 14. The contact detection signal includes information on the contact direction. In an example, contact is detected by a contact detection sensor 26, an approach sensor, or the like attached to the robot arm 21. According to another method, contact may be detected in accordance with a current value of the motor 23. For example, several contact detection sensors 26 are attached to a suction pad 22a, to be described later, attached to the robot arm 21. A contact direction can be detected easily in accordance with which one of the contact detection sensors 26 detects contact (see FIG. 2).

The contact condition detector 13 receives the contact detection signal from the contact detector 11, and transmits contact condition information to the holding motion selecting unit 14 in accordance with the contact detection signal thus received. The contact condition information includes a distance between the contacted object 30 and the hand 22 of the stopped robot 20, a direction of a force applied to the robot arm 21 of the robot 20 by the person 91, and/or a direction of contact between the robot arm 21 (hand 22) and the contacted object 30.

The distance between the object 30 and the hand 22 of the robot 20 is the distance between the object 30 and the hand 22 of the robot 20 at a time point when the robot 20 temporarily stops after the hand 22 of the robot 20 collides with the object 30 (contacts for holding the object). The distance can be measured directly by a distance sensor or the like attached to the hand 22, and the contact condition detector 13 can obtain the distance by receiving a measurement value from the distance sensor. Alternatively, the contact condition detector 13 can compare the position of the colliding hand 22 and the position of the stopped hand 22 in accordance with the joint angle q transmitted from the encoder 7 to the contact condition detector 13, to obtain the distance. The contact condition detector 13 can obtain a direction of force applied to the robot arm 21 of the robot 20 by the person 91 in accordance with information on the force applied to the robot arm 21 by the person 91 and detected by the force sensor 25. The direction of the force can be calculated by applying $$\arctan\left(\frac{F_{s2}}{F_{s1}}\right)$$

, in the force vector $F_s=[F_{s1}, F_{s2}]^T$ as information from the force sensor 25.

The holding motion selecting unit 14 selects, as holding motion, one of three types of "continuously stopped motion", "person associated motion with directional limitation", and "person associated motion with no directional limitation", in accordance with the contact condition information received from the contact condition detector 13. When the holding motion selecting unit 14 selects the "continuously stopped motion", the holding motion selecting unit 14 transmits information on every direction as a limitation signal to the direction limiting unit 5. When the holding motion selecting unit 14 selects "person associated motion with directional limitation", the holding motion selecting unit 14 transmits information on the limited direction as a limitation signal (limited direction information) to the direction limiting unit 5. In this case, holding motion is selected after the robot 20 collides with the object 30 and temporarily stops. When the holding motion selecting unit 14 receives a contact detection signal from the contact detector 11, the holding motion selecting unit 14 always transmits an every directional limitation signal to the direction limiting unit 5 for a predetermined period (e.g. 1 second) in order to stop motion of the robot 20. The holding motion selecting unit 14 then transmits, to the direction limiting unit 5, a limitation signal (limited direction information) for the holding motion selected from the three types of holding motion in accordance with the contact condition information received from the contact condition detector 13. When the holding motion selecting unit 14 receives hand information on the robot arm 21, indicating that the hand 22 is closed or the hand 22 holds the object 30, the holding motion selecting unit 14 ends outputting a limitation signal.

In an example, the holding motion indicates sucking motion. Specifically, the hand 22 is provided with the suction pad 22a configured to suck the object 30, and the suction pad 22a is provided with a pressure sensor 22b. The pressure sensor 22b detects hold of the object 30, in other words, change in suction force of the suction pad 22a sucking the object 30 to detect whether or not the suction pad 22a sucks the object 30. The pressure sensor 22b transmits to the control apparatus 50 the detection result as information on whether or not the hand 22 holds the object.

The specific motion of the holding motion selecting unit 14 is described below. When the hand 22 of the robot arm 21 is made in contact with the held object 30 and then stops in a state where the hand 22 is substantially in contact with the held object 30, further motion of pressing the hand 22 of the robot arm 21 against the object 30 dangerously generates excessive pressing force between the hand 22 and the object 30. The holding motion selecting unit 14 desirably causes continuously stopped motion without selecting person associated motion in order to avoid such motion. When the holding motion selecting unit 14 determines that the information on the distance between the contacted object 30 and the hand 22 of the stopped robot 20 in the contact condition information is less than a predetermined threshold value, the holding motion selecting unit 14 selects continuously stopped motion. The threshold value is predeterminedly obtained through a test or the like as a relative distance between the object 30 and the suction pad 22a that can reliably hold the object. The holding motion selecting unit 14 stores the threshold value in a storage unit provided therein.

When the contact direction is different from the direction of hold with the hand 22, the holding motion selecting unit 14 determines that the hand 22 is in contact not for holding but the robot arm 21 collides with a peripheral matter different from the object 30 to be held or determines that the robot arm 21 collides with the object 30 to be held but the robot arm 21 and the object 30 do not have positional relationship appropriate for hold. In this case, the holding motion selecting unit 14 desirably causes continuously stopped motion without selecting person associated motion. When the holding motion selecting unit 14 determines that the contact direction in the contact condition information is different from the direction of hold with the hand 22, the holding motion selecting unit 14 selects continuously stopped motion.

An example of detection of the contact direction with the contact detection sensor 26 shown in FIG. 2 is described as an example of determination by the holding motion selecting unit 14 as to whether or not the contact direction is equal to the direction of hold with the hand 22. The suction pad 22a holding the object is in contact with the object in the negative direction on the y axis, and the lower surface of the suction pad 22a serves as a suction surface. The contact detection sensors 26 are thus attached to the suction surface of the suction pad 22a and the like in several directions. When the contact detection sensors 26 attached to the suction surface detect contact, the holding motion selecting unit 14 receives from the contact condition detector 13 a contact detection signal indicating that the direction of contact with the object is equal to the negative direction on the y axis. In this case, the holding motion selecting unit 14 can determine that the contact direction is equal to the direction of hold with the hand 22. When the contact detection sensor 26 attached to a side surface of the suction pad 22a in the positive direction on the x axis detects contact, the holding motion selecting unit 14 receives from the contact condition detector 13 a contact detection signal indicating that the direction of contact with the object is equal to the positive direction on the x axis. In this case, the holding motion selecting unit 14 can determine that the contact direction is not equal to the direction of hold with the hand 22.

Figure 10B:
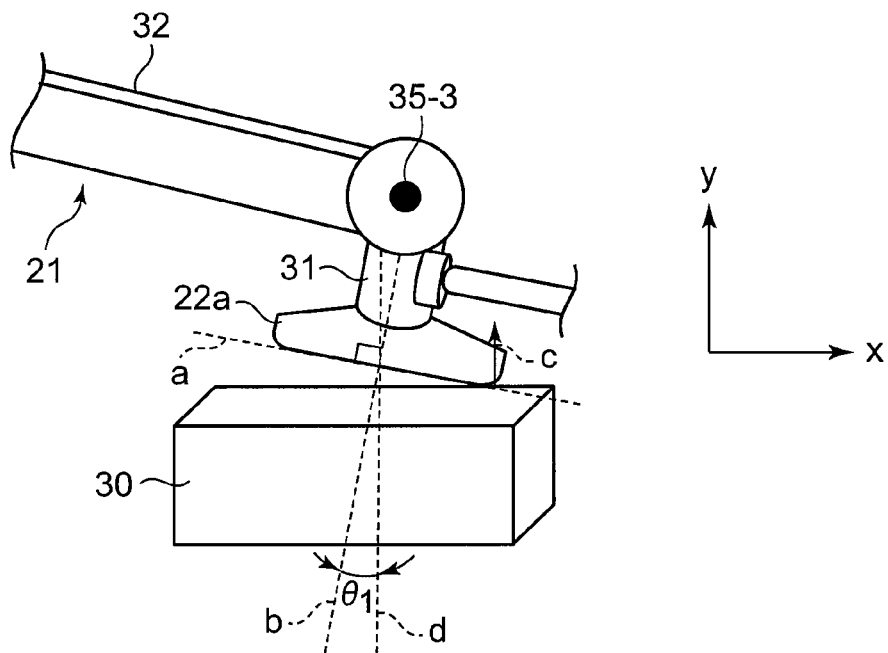
FIG. 10B is a view showing an example of a direction of holding a held object with a robot arm according to the first embodiment of the present disclosure.

Determination by the holding motion selecting unit 14 as to whether or not the contact direction is equal to the direction of hold with the hand 22 is exemplified with reference to FIGS. 10A and 10B.

In the example shown in FIG. 10A, the holding motion selecting unit 14 receives from the contact condition detector 13 a contact detection signal indicating that the contact direction (a solid line "c") is equal to the positive direction on the y axis. A direction (a dashed line "b") perpendicular to the suction surface (a dashed line "a") of the suction pad 22a is not equal to the y axis. The contact direction is not necessarily equal to the direction of hold with the hand 22 in this case. The suction pad 22a can hold the object 30 even when the suction pad 22a is pressed against the object 30 in a slightly different direction. An angle between the direction (the dashed line "b") perpendicular to the suction surface of the suction pad 22a and the contact direction (the solid line "c") (the angle between the direction perpendicular to a surface of the holder facing the object 30 and a direction detected by the contact detector 11), in other words, a threshold value of an angle $\theta_1$ between the dashed line "b" and a dashed line "d" (a holding direction determination threshold value) is predetermined through a test or the like. The holding motion selecting unit 14 stores the threshold value in the storage unit provided therein. The angle $\theta_1$ is equal to or less than the threshold value (the holding direction determination threshold value) in the case of FIG. 10A. The suction pad 22a can hold the object 30 and the holding motion selecting unit 14 determines that the contact direction is equal to the direction of hold with the hand 22.

In the example shown in FIG. 10B, an angle between the direction (the dashed line "b") perpendicular to the suction surface of the suction pad 22a and the contact direction (the solid line "c"), namely, an angle $\theta_2$ between the dashed line "b" and the dashed line "d", exceeds the threshold value. Then, the holding motion selecting unit 14 determines that the contact direction is not equal to the direction of hold with the hand 22.

The hand 22 is not limited to the suction pad 22a but can be alternatively a hand provided to perform ordinary holding motion. The hand 22 is exemplified in FIGS. 11A and 11B.

Figure 11A:
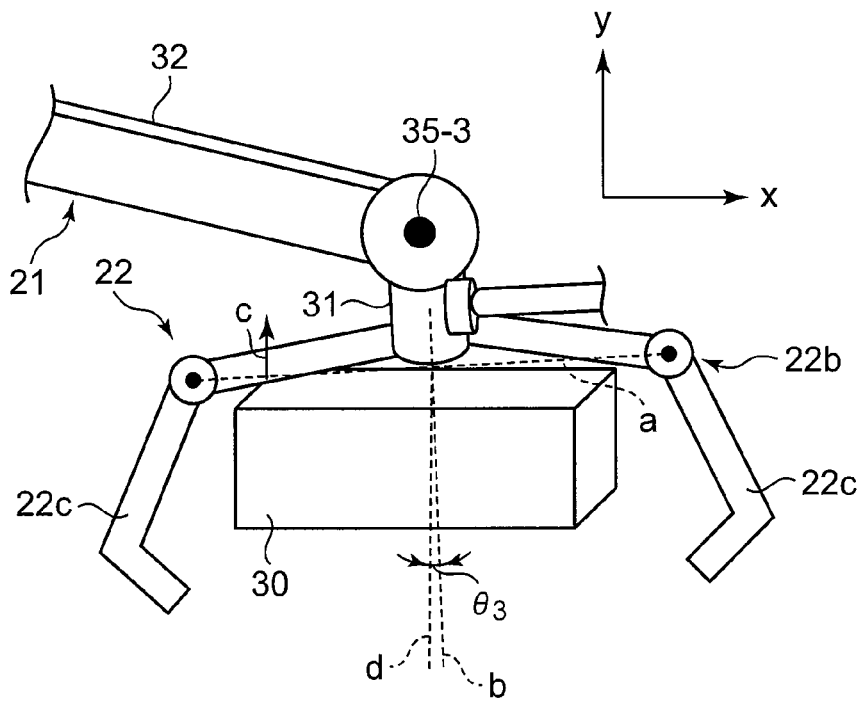
FIG. 11A is a view showing an example of a direction of holding a held object with a robot arm having a hand structure according to the first embodiment of the present disclosure.

Similarly to FIG. 10A, FIG. 11A exemplifies determination by the holding motion selecting unit 14 that the contact direction is equal to the direction of hold with the hand 22. In a case where the hand 22 has a configuration of chucks 22b, there is no apparent contact surface between the hand 22 and the object 30 like the suction surface of the suction pad 22a but a plane including the dashed line "a" connecting the rotation support points of L-shaped bent portions 22c of the chucks 22b corresponds to the surface facing the object 30. This plane is substantially parallel to the surface of the object 30 closest to the proximal end of the hand 22 and facing the hand 22 when the object is held horizontally. When an angle between the dashed line "b" perpendicular to the plane and the contact direction (the solid line "c"), namely, an angle $\theta_3$ between the dashed line "b" and the dashed line "d", is equal to or less than the threshold value, the hand 22 can hold the object. The holding motion selecting unit 14 thus determines that the contact direction is equal to the direction of hold with the hand 22.

Figure 11B:
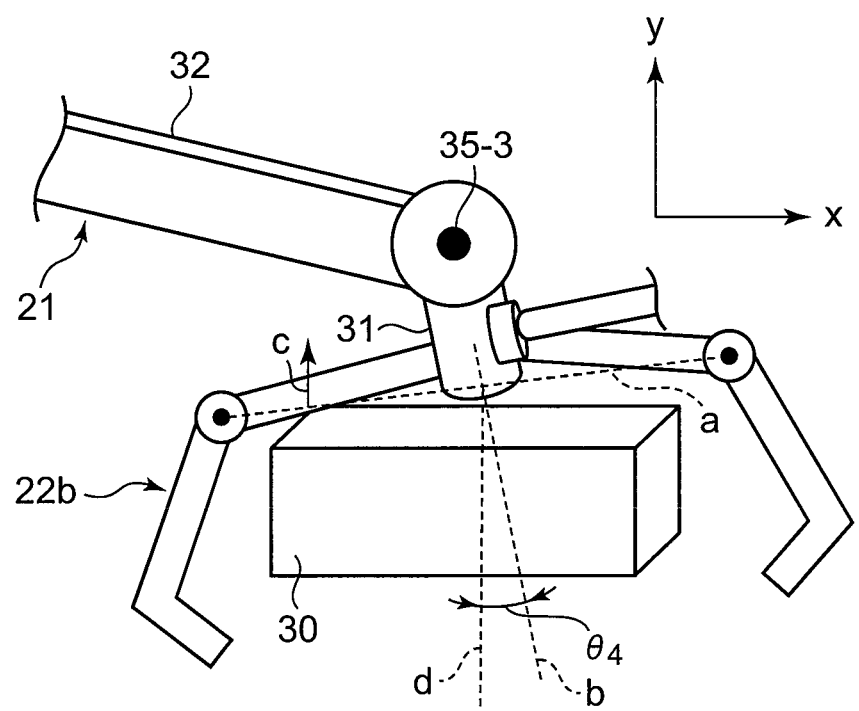
FIG. 11B is a view showing an example of a direction of holding a held object with a robot arm having a hand structure according to the first embodiment of the present disclosure.

Similarly in FIG. 11B, the dashed line "b" is defined to be perpendicular to the plane including the dashed line "a". An angle $\theta_4$ between the dashed line "b" and the dashed line "d" is equal to or more than the threshold value in this case. The holding motion selecting unit 14 thus determines that the contact direction is not equal to the direction of hold with the hand 22.

Described next is a case where the holding motion selecting unit 14 determines that the distance between the object 30 and the hand 22 of the stopped robot 20 is equal to or more than the threshold value.

Figure 5B:
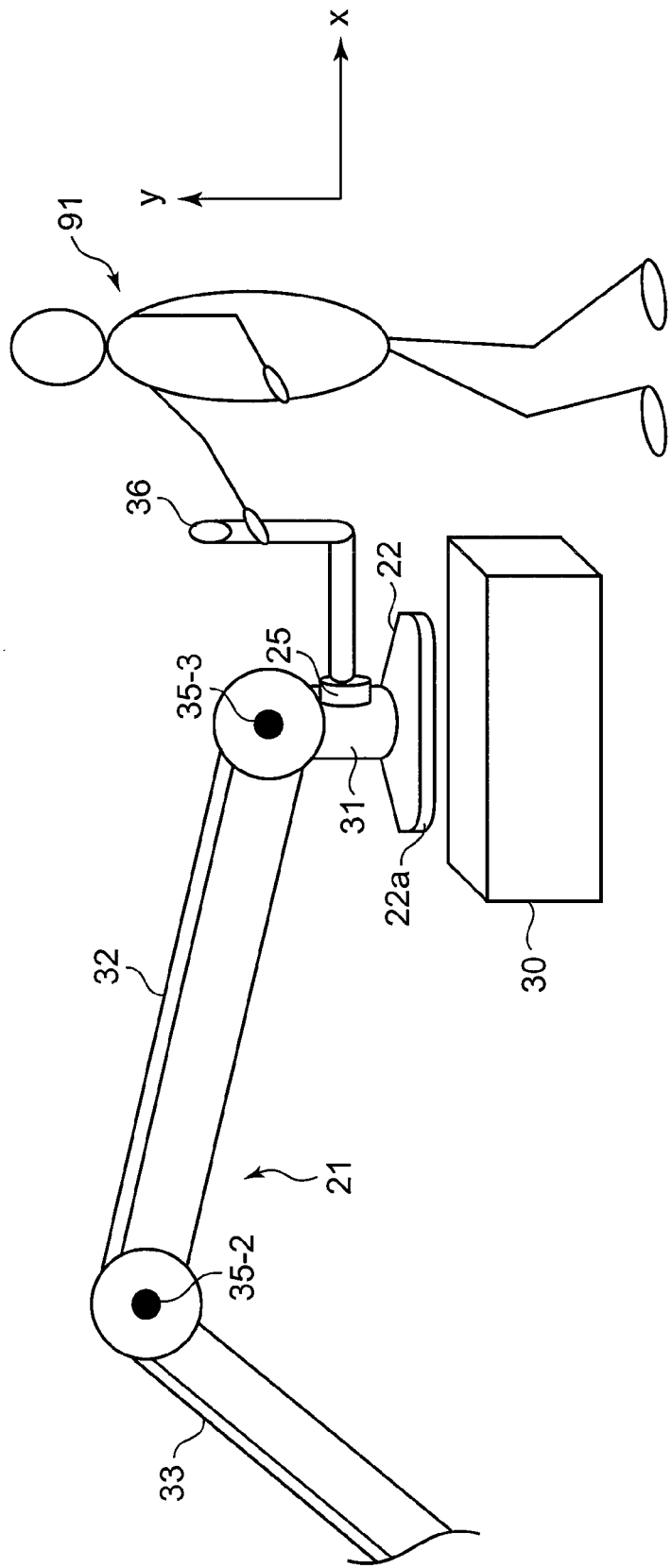
FIG. 5B is a plan view showing an example of positional relationship between the robot according to the first embodiment of the present disclosure and a held object.

FIGS. 5A and 5B are a plan view and a perspective view, respectively, exemplifying positions of the person 91, the robot arm 21, and the object 30 when the person 91 intends to cause the hand 22 to hold the object 30 in a state where the robot 20 is stopped after the object 30 is made in contact with the hand 22. As shown in FIGS. 5A and 5B, when an entire holding surface (e.g. the suction surface) of the hand 22 is positioned to face to the object 30, the person 91 has only to move the holding surface of the hand 22 in a direction of being pressed against the object 30 (a holding direction) (the negative direction on the y axis in FIG. 5B). The person 91 applies force mainly in the negative direction on the y axis. When the suction pad 22a holds an object, motion direction of the robot arm immediately before the hold, in other words, the direction of last approaching motion is equal to the direction of pressing the holding surface (suction surface) against the object, in other words, the negative direction on the y axis in FIG. 5B. When the person 91 applies force only in the negative direction on the y axis, in other words, the direction of pressing the holding surface of the hand 22 against the object 30 (the holding direction) after contacting and stopping, the holding motion selecting unit 14 selects person associated motion of moving the hand 22 limitedly in the direction of approaching to hold the object 30, in other words, only in the direction on the y axis in FIG. 5B ("person associated motion with directional limitation"). In this case, information on the limited direction on the x axis is outputted as limited direction information.

When the person 91 applies force to the robot arm 21 of the robot 20 in the direction of holding the object 30 to shift the robot arm 21 of the robot 20 and cause the hand 22 to hold the object 30, the holding motion selecting unit 14 selects "person associated motion with directional limitation" in this manner. Such appropriate selection of motion with the holding motion selecting unit 14 enables smooth motion of the robot arm 21 of the robot 20 and safe hold of the object 30.

Figure 12A:
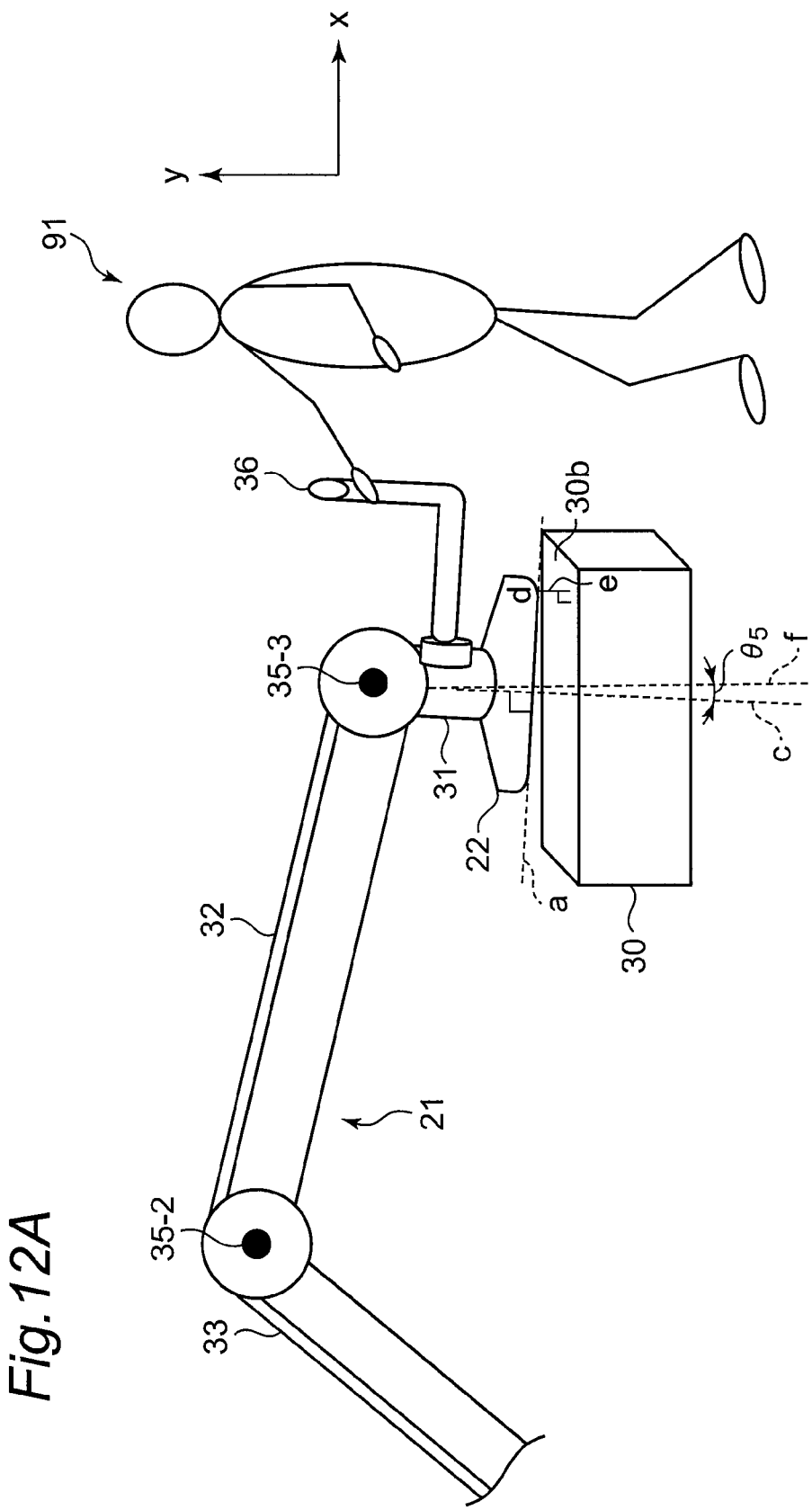
FIG. 12A is a view showing an example of a direction of last approaching motion upon holding a held object with the robot arm according to the first embodiment of the present disclosure.
Figure 12B:
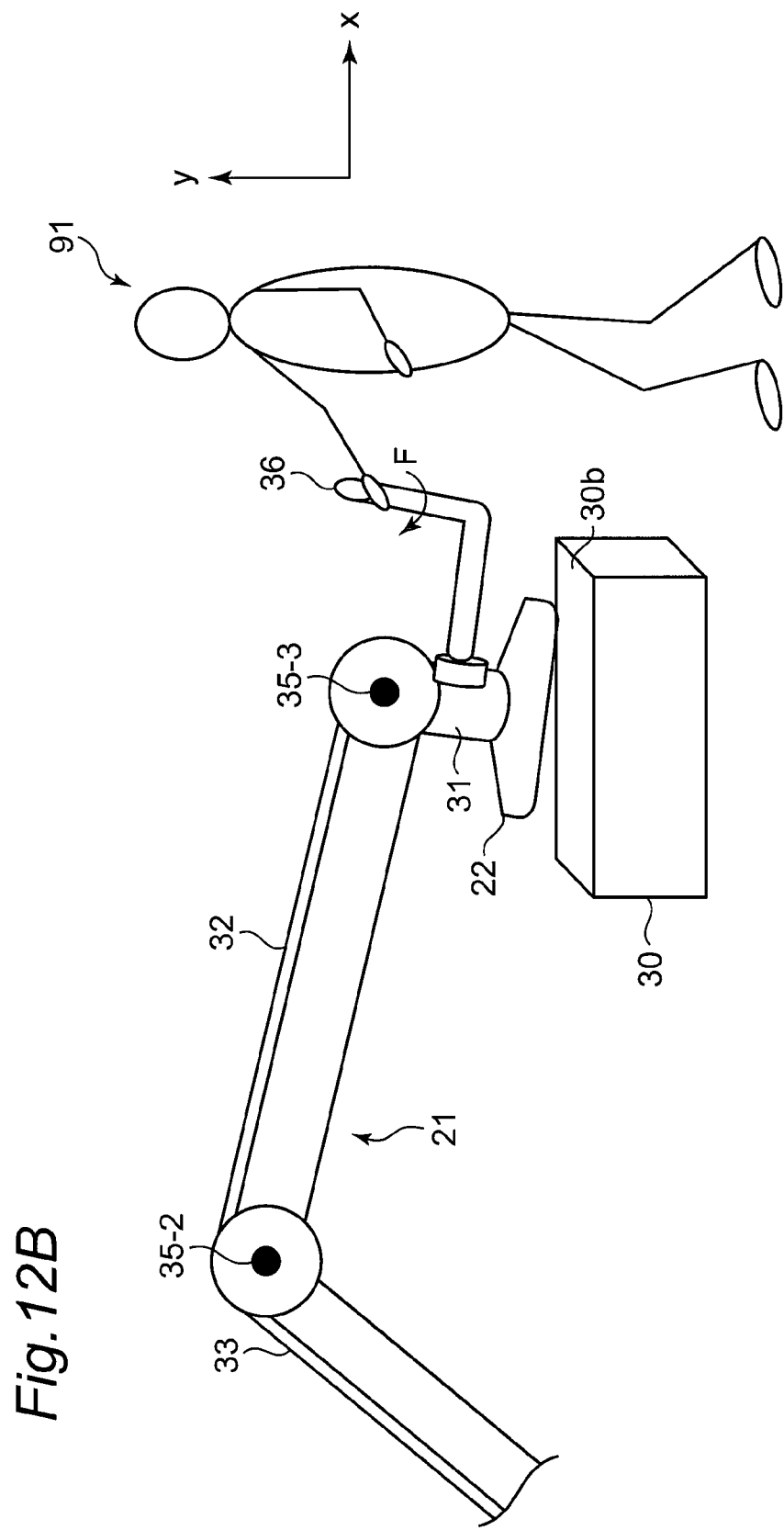
FIG. 12B is a view showing an example of a direction of last approaching motion upon holding a held object with the robot arm according to the first embodiment of the present disclosure.

Determination by the holding motion selecting unit 14 as to whether or not the direction of force applied to the robot arm 21 of the robot 20 by the person 91 is equal to the direction of the last approaching motion is exemplified with reference to FIGS. 12A and 12B.

In FIG. 12A, a surface of the suction pad 22a that faces the object 30 is the suction surface (the dashed line "a") thereof. A surface of the object 30 that faces the suction surface of the suction pad 22a is an upper surface 30b. A direction in which a point (point "d") in the suction surface closest to the upper surface 30b of the object 30 and the upper surface 30b of the object 30 have the shortest distance is equal to the direction of a perpendicular line (a solid line "e") from the point "d" to the upper surface 30b of the object 30. An approaching direction of the last approaching motion is equal to the direction of approaching the suction surface to the upper surface 30b of the object 30 in a state where an angle $\theta_5$ between a dashed line "f" parallel to the solid line "e" and a perpendicular line (a dashed line "c") to the suction surface of the suction pad 22a facing the object 30 is kept less than the threshold value (the holding direction determination threshold value). In other words, the angle $\theta_5$ in FIG. 12A is formed between the direction in which the point closest to the surface of the object 30 facing the holder in the surface of the holder facing the object 30 and the surface of the object 30 facing the holder has the shortest distance and the perpendicular line to the surface of the holder facing the object 30. The robot arm 21 shifts in the direction of force applied to the robot arm 21 of the robot 20 by the person 91. When the direction of the force applied by the person 91 is parallel to the dashed line "f" and the force has a vector including a negative Y component, the holding motion selecting unit 14 determines that the direction of the force is the approaching direction in the last approaching motion. When the direction of the force applied by the person 91 is parallel to the dashed line "c" but the force has a vector including a positive Y component, the angle $\theta_5$ between the direction in which the distance from the surface of the object 30 facing the suction surface of the suction pad 22a is the shortest and the perpendicular line to the suction surface of the suction pad 22a facing the object 30 is kept smaller than the threshold value (the holding direction determination threshold value) while the surface of the object 30 facing the suction surface of the suction pad 22a is shifted apart from the surface of the suction surface of the suction pad 22a facing the object 30. Thus, the holding motion selecting unit 14 determines that the direction is not equal to the approaching direction. When the person 91 applies force in a direction F indicated in FIG. 12B from the state of FIG. 12A, the angle between the direction in which the distance from the surface of the object 30 facing the suction surface of the suction pad 22a is the shortest and the perpendicular line to the suction surface of the suction pad 22a facing the object 30 is made larger than the threshold value (the holding direction determination threshold value). Thus, the holding motion selecting unit 14 still determines that the direction of the force is not an approaching direction in the last approaching motion.

Figure 6B:
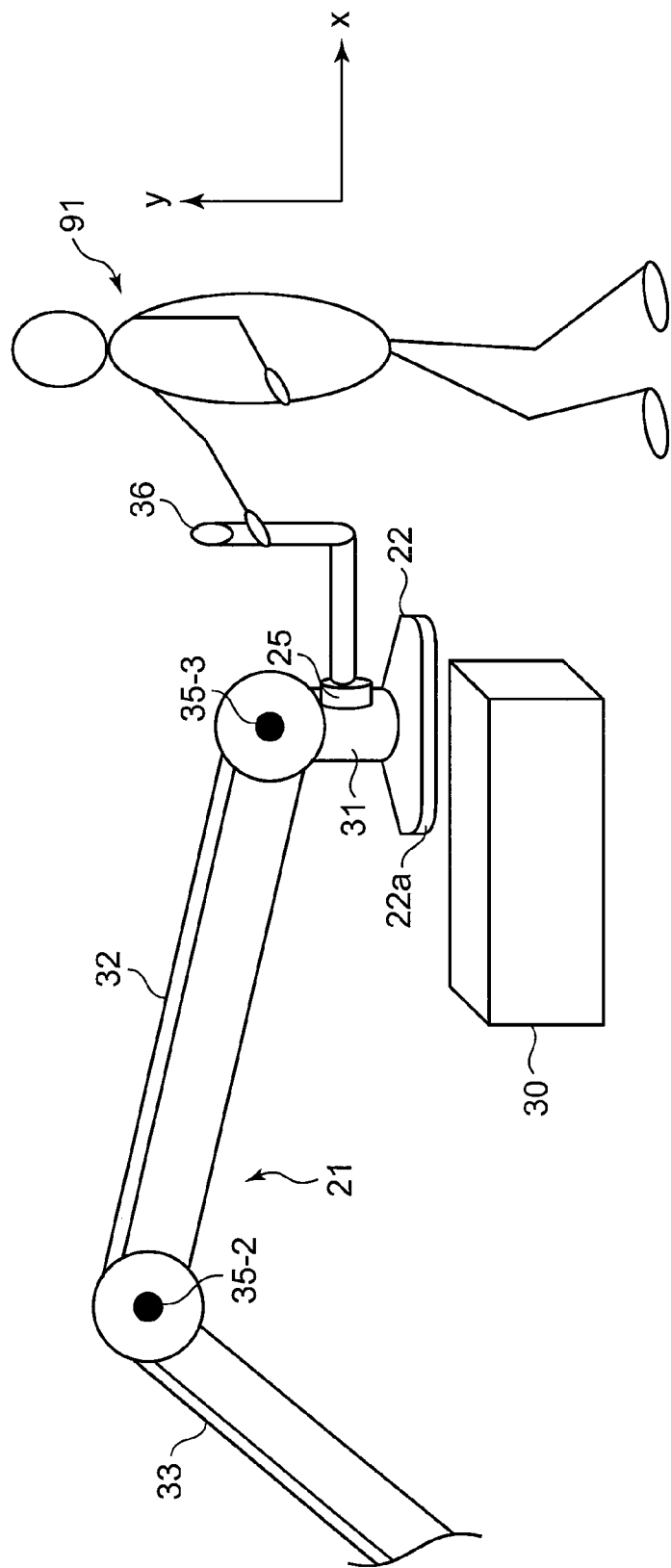
FIG. 6B is a plan view showing an example of positional relationship between the robot according to the first embodiment of the present disclosure and a held object.

Here is another example. FIGS. 6A and 6B are a plan view and a perspective view, respectively, exemplifying positions of the person 91, the robot arm 21, and the object 30 when the person 91 intends to cause the hand 22 to hold the object 30 in a state where the robot 20 is stopped after the object 30 is made in contact with the hand 22. The holding surface of the hand 22 does not entirely face the object 30 in the case of FIGS. 6A and 6B. The person 91 thus needs to shift the hand 22 so that the holding surface of the hand 22 is located above the upper surface of the object 30. The person 91 needs to apply force also in the negative direction on the x axis in the example of FIGS. 6A and 6B. When the person 91 applies force in the direction (the holding direction) of pressing the holding surface of the hand 22 against the object 30 as well as in a different direction after the object 30 is made in contact with the hand 22 and the robot 20 stops, the holding motion selecting unit 14 determines that the person 91 intends to modify the held position by the hand 22 and selects person associated motion of moving in every direction ("person associated motion with no directional limitation"). The holding motion selecting unit 14 outputs nothing because no limitation is made in this example.

The person 91 applies force in the direction of holding the object 30 with the robot arm 21 of the robot 20 as well as in a different direction to shift the robot arm 21 of the robot 20 in this manner. Motion selected by the holding motion selecting unit 14 does not disturb modification of a displaced position of the hand 22 relative to the object 30, and the robot arm 21 of the robot 20 can move smoothly to safely hold the object 30.

Figure 4:
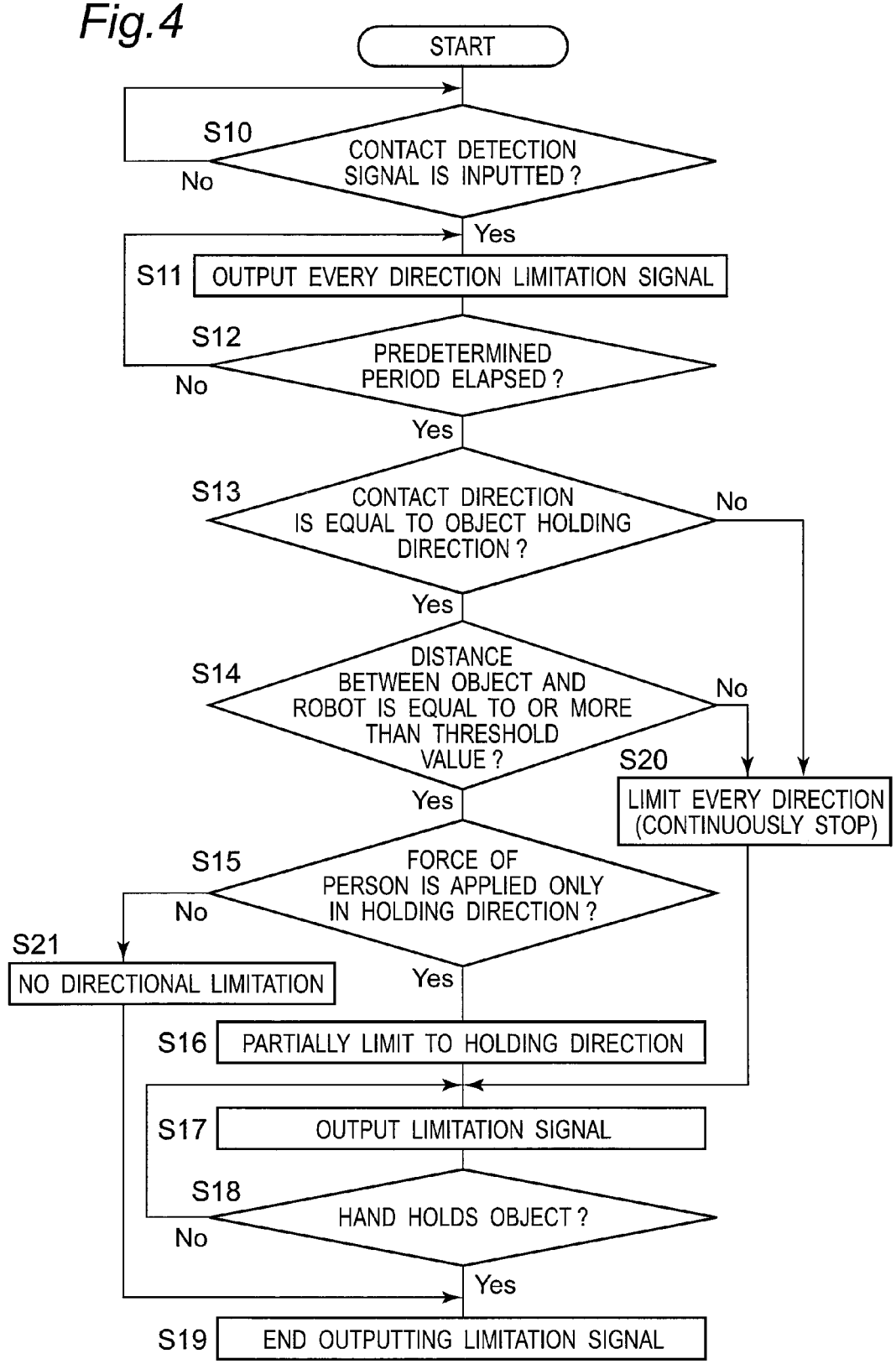
FIG. 4 is a flowchart indicating motion steps of a holding motion selecting unit according to the first embodiment of the present disclosure.

Actual motion steps of the holding motion selecting unit 14 are described with reference to the flowchart in FIG. 4.

Initially in step S10, the holding motion selecting unit 14 checks whether or not a contact detection signal is received from the contact detector 11. The step S10 is repeated if no signal is received.

Described below is a case where the holding motion selecting unit 14 receives a contact detection signal from the contact detector 11 in step S10.

Next, in step S11, the holding motion selecting unit 14 transmits an every direction limitation signal (a stop signal) to the direction limiting unit 5 in order to stop motion of the robot 20. The direction limiting unit 5 thus transmits a directionally limited force vector $F_{rs}=[0, 0]^T$ to the force controller 12. The desired position adding unit 8 to the desired joint torque calculating unit 3 each receive and transmit the information and appropriately perform calculation or the like, so that desired joint torque $\tau_d$ for stopped motion is calculated. The desired joint torque calculating unit 3 transmits, as a stop signal, to the motor driver 24 the desired joint torque $\tau_d$ for stopped motion thus calculated, and the robot 20 temporarily stops motion.

Next, in step S12, the holding motion selecting unit 14 checks whether or not a predetermined period has elapsed using an incorporated timer. When the holding motion selecting unit 14 determines that the predetermined period has not elapsed, the flow returns to step S11 and the holding motion selecting unit 14 transmits an every direction limitation signal to the direction limiting unit 5 in order to continue stopped motion of the robot 20.

Described below is a case where the holding motion selecting unit 14 determines that the predetermined period (e.g. several seconds) has elapsed in step S12.

Next, in step S13, the holding motion selecting unit 14 determines whether or not the direction of contact between the robot arm 21 of the robot 20 and the contacted object 30 is equal to the predetermined holding direction in accordance with the contact condition information.

Described below is a case where the holding motion selecting unit 14 determines that the contact direction is equal to the predetermined holding direction in step S13.

Next, in step S14, the holding motion selecting unit 14 determines whether or not the distance between the robot 20 and the contacted object 30 is equal to or more than the predetermined threshold value in accordance with the contact condition information.

Described below is a case where the holding motion selecting unit 14 determines that the distance between the robot 20 and the contacted object 30 is equal to or more than the threshold value in step S14.

Next, in step S15, the holding motion selecting unit 14 checks whether or not the person 91 applies force only in the direction (the holding direction) of pressing the hand 22 against the object 30 in accordance with the contact condition information. When the holding motion selecting unit 14 determines that the person 91 applies force only in the direction (the holding direction) of pressing the hand 22 against the object 30, the flow proceeds to step S16. If not, the flow proceeds to step S21.

Described below is a case where the holding motion selecting unit 14 determines that the person 91 applies force only in the direction (the holding direction) of pressing the hand 22 against the object 30 in step S15.

Next, in step S16, the holding motion selecting unit 14 selects person associated motion of limiting the motion direction of the robot 20 only to the holding direction ("person associated motion with directional limitation").

Next, in step S17, the holding motion selecting unit 14 transmits to the direction limiting unit 5 a limitation signal including information on the limited direction (limited direction information) in accordance with the "person associated motion with directional limitation" selected in step S16.

Next, in step S18, the holding motion selecting unit 14 checks (determines) whether or not the hand 22 holds the object 30 in accordance with information and the like from the pressure sensor 22b of the suction pad 22a. If the holding motion selecting unit 14 determines that the hand 22 does not hold the object 30, the flow returns to step S17 and the holding motion selecting unit 14 continuously outputs a limitation signal.

Described below is a case where the holding motion selecting unit 14 determines that the hand 22 holds the object 30 in step S18.

Next, in step S19, the holding motion selecting unit 14 ends outputting a limitation signal.

Through the motions from step S10 to step S19, the holding motion selecting unit 14 outputs a limitation signal after the hand 22 is made in contact with the object 30, so as to enable motion until the holding motion selecting unit 14 ends outputting a limitation signal.

Described below is a case where the holding motion selecting unit 14 determines that the person 91 applies force not only in the direction (the holding direction) of pressing the hand 22 against the object 30 in step S15.

Next, in step S21, the holding motion selecting unit 14 selects person associated motion in every motion direction with no directional limitation.

Next, the holding motion selecting unit 14 selects person associated motion with no directional limitation in step S15. In step S19, the holding motion selecting unit 14 ends outputting a limitation signal.

Through the motions from step S10 to step S15 as well as in step S21 and in step S19, the holding motion selecting unit 14 selects person associated motion without any directional limitation ("person associated motion with no directional limitation") after the hand 22 is made in contact with the object 30 and directional limitation is stopped temporarily, so as to enable motion until the holding motion selecting unit 14 ends outputting a limitation signal.

Described below is a case where the distance is less than the threshold value in step S14.

In step S20, the holding motion selecting unit 14 selects continuously stopped motion. Limitation is applied to every direction in this case.

Next, in step S17, the holding motion selecting unit 14 transmits to the direction limiting unit 5 a signal indicating a limited direction in accordance with the "person associated motion with directional limitation" selected in step S16.

Next, in step S18, the holding motion selecting unit 14 checks (determines) whether or not the hand 22 holds the object 30 in accordance with information and the like from the pressure sensor 22b of the suction pad 22a. If the holding motion selecting unit 14 determines that the hand 22 does not hold the object 30, the flow returns to step S17 and the holding motion selecting unit 14 continuously outputs a limitation signal.

Described below is a case where the holding motion selecting unit 14 determines that the hand 22 holds the object 30 in step S18.

Next, in step S19, the holding motion selecting unit 14 ends outputting a limitation signal.

Through the motions from step S10 to step S14 and step S17 to step S20, the holding motion selecting unit 14 outputs a limitation signal after the hand 22 is made in contact with the object 30, so as to stop motion of the robot 20 and enable motion until the holding motion selecting unit 14 ends outputting a limitation signal.

Described below is a case where the holding motion selecting unit 14 determines that the contact direction is not equal to the predetermined holding direction in step S13.

Next, in step S20, the holding motion selecting unit 14 selects continuously stopped motion. Limitation is applied to every direction in this case.

The motions from step S17 to step S19 is similar to that described above.

Through the motions from step S10 to step S13 and step S17 to step S20, the holding motion selecting unit 14 outputs a limitation signal after the hand 22 is made in contact with the object 30, so as to stop motion of the robot 20 and enable motion until the holding motion selecting unit 14 ends outputting a limitation signal.

Figure 7:
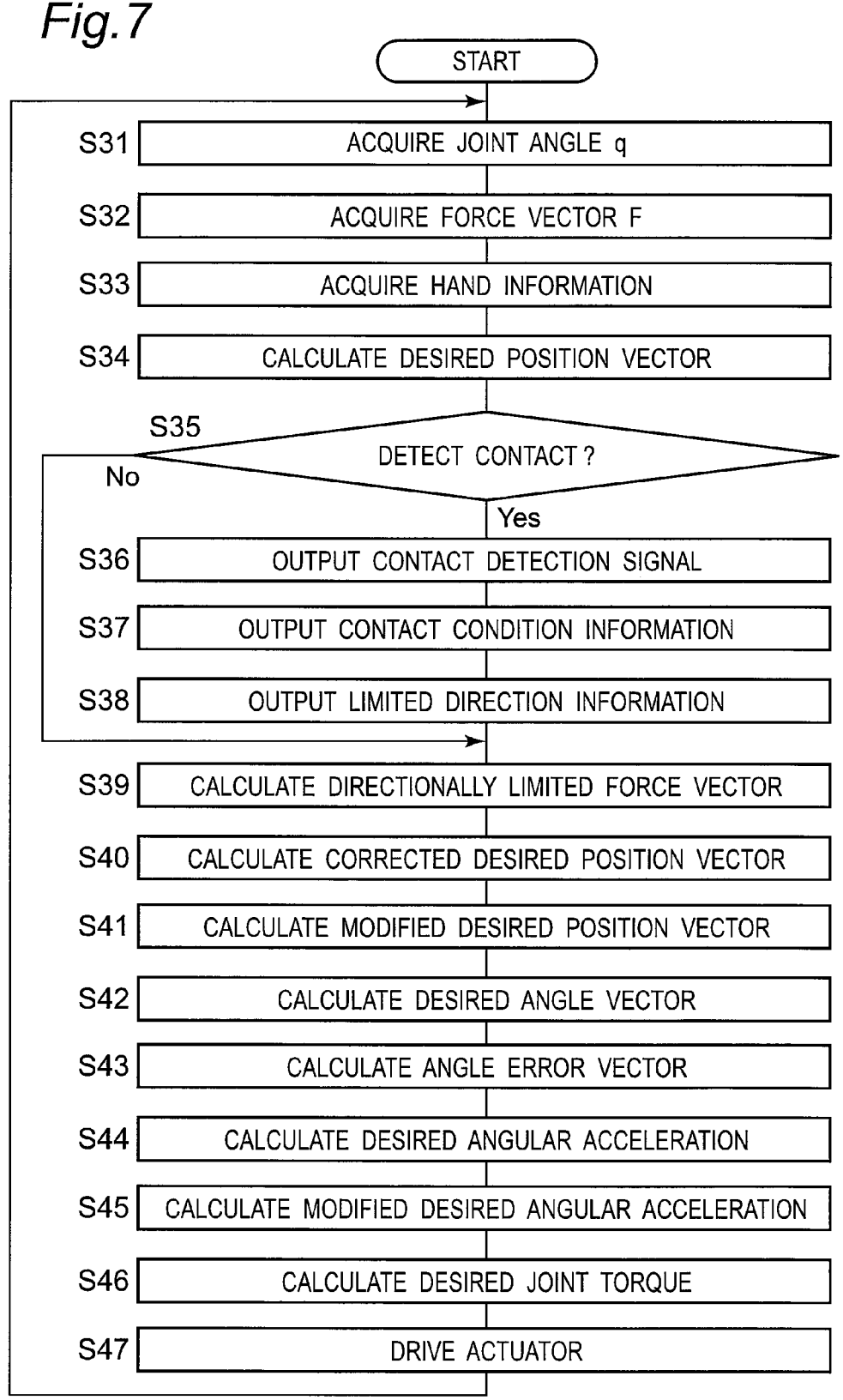
FIG. 7 is a flowchart indicating motion steps of the control apparatus according to the first embodiment of the present disclosure.

Actual motion steps in the control program 40 of the control apparatus 50 based on the above principle are described with reference to the flowchart in FIG. 7.

Initially in step S31, the control program 40 (the output error calculating unit 9 and the contact condition detector 13) receives the joint angle q transmitted from the encoder 7.

Next, in step S32, the control program 40 (the direction limiting unit 5) receives the force vector F transmitted from the force sensor 25.

Next, in step S33, the control program 40 (the holding motion selecting unit 14) receives information on the hand 22 (e.g. information on detection by the pressure sensor 22b).

Next, in step S34, the desired trajectory generating unit 1 generates a desired position vector $r_d$ and transmits the generated vector to the desired position adding unit 8.

Next, in step S35, the contact detector 11 checks (detects) whether or not the robot 20 is in contact with an external matter.

Described below is a case where the contact detector 11 confirms (detects) contact in step S35.

Next, in step S36, the contact detector 11 transmits a contact detection signal to the contact condition detector 13 and the holding motion selecting unit 14.

Next, in step S37, the contact condition detector 13 transmits contact condition information to the holding motion selecting unit 14 in accordance with the contact detection signal from the contact detector 11.

Next, in step S38, the holding motion selecting unit 14 selects holding motion of the robot 20 in accordance with the contact detection signal from the contact detector 11 and the contact condition information from the contact condition detector 13, and transmits limited direction information to the direction limiting unit 5.

Next, in step S39, the direction limiting unit 5 calculates a directionally limited force vector $F_{rs}$ from the limited direction information received from the holding motion selecting unit 14 and the force vector F received from the force sensor 25, and transmits the calculated vector to the force controller 12.

Next, in step S40, the force controller 12 calculates a corrected desired position vector $\Delta r_d$ from the directionally limited force vector $F_{rs}$ received from the direction limiting unit 5 and transmits the calculated vector to the desired position adding unit 8.

Next, in step S41, the desired position adding unit 8 adds the desired position vector $r_d$ from the desired trajectory generating unit 1 and the corrected desired position vector $\Delta r_d$ from the desired position adding unit 8 to calculate a modified desired position vector $r_{dm}$, and transmits the calculated vector to the inverse kinematics calculating unit 4.

Next, in step S42, the inverse kinematics calculating unit 4 calculates a desired angle vector $q_{dm}$ from the modified desired position vector $r_{dm}$ received from the desired position adding unit 8, and transmits the calculated vector to the desired angular acceleration calculating unit 2 and the output error calculating unit 9.

Next, in step S43, the output error calculating unit 9 calculates an angle error vector $q_e$ from the desired angle vector $q_{dm}$ received from the inverse kinematics calculating unit 4 and the output q of the encoder 7, and transmits the calculated vector to the modified desired angular acceleration calculating unit 10.

Next, in step S44, the desired angular acceleration calculating unit 2 calculates desired angular acceleration $\ddot{q}_d$ from the desired angle vector $q_{dm}$ received from the inverse kinematics calculating unit 4, and transmits the calculated angular acceleration to the modified desired angular acceleration calculating unit 10.

In step S45, the modified desired angular acceleration calculating unit 10 calculates modified desired angular acceleration $\ddot{q}^*_d$ from the angle error vector $q_e$ received from the output error calculating unit 9 and the desired angular acceleration $\ddot{q}_d$ received from the desired angular acceleration calculating unit 2, and transmits the calculated angular acceleration to the desired joint torque calculating unit 3.

Next, in step S46, the desired joint torque calculating unit 3 calculates desired joint torque $\tau_d$ from the modified desired angular acceleration $\ddot{q}^*_d$ received from the modified desired angular acceleration calculating unit 10 and the dynamics parameters preliminarily stored in the storage unit of the desired joint torque calculating unit 3, and transmits the calculated torque to the motor driver 24 of the robot mechanism 6.

Next, in step S47, the motor driver 24 receives the desired joint torque $\tau_d$ from the desired joint torque calculating unit 3 through the input/output IF 41 to drive the motors 23 and move the robot 20.

The motions from step S31 to step S47 is executed repeatedly as a control calculation loop, and motion of the robot 20 is thus controlled.

Described below is a case where the contact detector 11 does not confirm contact in step S35.

Next, in step S39, the direction limiting unit 5 calculates a directionally limited force vector $F_{rs}$ from the limited direction information received from the holding motion selecting unit 14 and the force vector F received from the force sensor 25, and transmits the calculated vector to the force controller 12. If the contact detector 11 does not confirm (detect) contact, the holding motion selecting unit 14 outputs nothing. The direction limiting unit 5 does not limit in any direction in this case and the directionally limited force vector is equal in value to the force vector F received from the force sensor 25.

The motions from step S40 to step S47 is similar to that described above.

The motions from step S31 to step S35 and from step S39 to step S47 is executed repeatedly as a control calculation loop, and motion of the robot 20 is thus controlled.

As described above, the control apparatus 50 according to the first embodiment includes the desired trajectory generating unit 1, the desired position adding unit 8, the direction limiting unit 5, the inverse kinematics calculating unit 4, the desired angular acceleration calculating unit 2, the desired joint torque calculating unit 3, the output error calculating unit 9, the modified desired angular acceleration calculating unit 10, the force controller 12, the contact detector 11, the contact condition detector 13, and the holding motion selecting unit 14. The robot 20 is configured to control torque of the motor 23. The holding motion selecting unit 14 or the direction limiting unit 5 limits the direction of person associated motion and selects to stop motion of the robot arm 21 when the person 91 causes the robot arm 21 to hold the object 30. The robot 20 can be controlled safely even when the robot arm 21 is made in contact with the object 30 in order to hold the object 30.

The first embodiment describes the feature that the hand 22 of the robot 20 stops at a position displaced from the contact position with the object 30 when the robot 20 stops after the robot 20 is made in contact with the object 30 (i.e. the object 30 and the hand 22 of the robot 20 are distant from each other when the robot 20 temporarily stops after the robot 20 collides with the object 30). Such displacement is caused more markedly when the robot arm 21 itself is deformed with force applied by the person 91. Exemplarily assumed herein is a case where the actuator is not rigid with no elasticity like the motor 23 but is elastic as in a robot 20B including a pneumatic artificial muscle 101. The robot 20B includes the actuator that is elastic by itself. When the robot arm 21 is pressed with force of the person 91, the hand 22 of the robot arm 21 is shifted to some extent. When the person 91 applies force to the robot 20B to move the robot 20B, the robot 20B is displaced slightly if the person 91 stops applying the force. The position of the hand 22 of the robot 20B colliding with the object 30 is displaced in many cases from the position of the hand 22 when the robot 20B stops motion. The technique according to the first embodiment is thus applicable effectively. Specifically described below is a modification example of the first embodiment.

Figure 8:
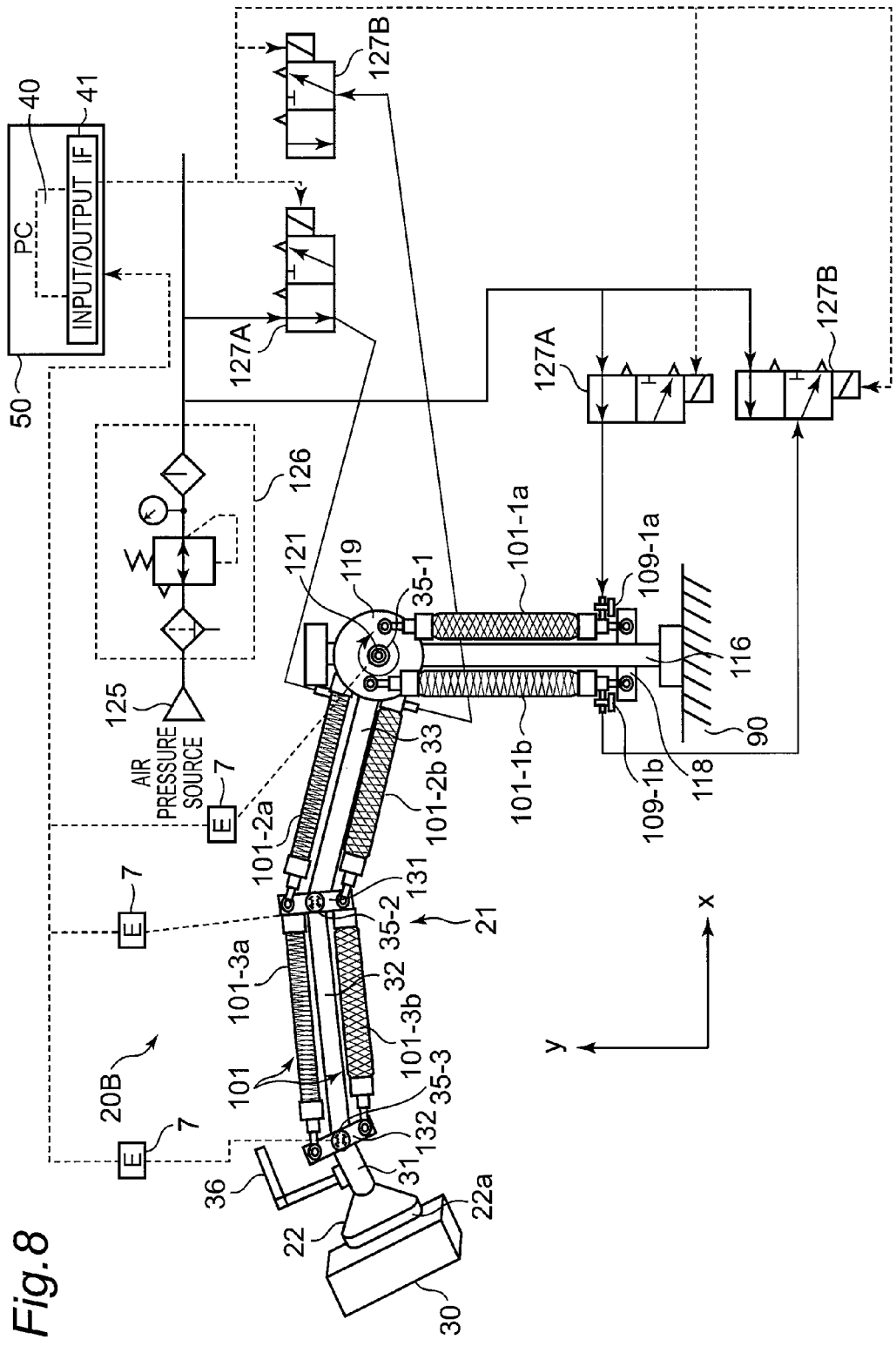
FIG. 8 is a view schematically showing a robot system according to the first embodiment of the present disclosure, the robot system including a pneumatic artificial muscle as an actuator.

FIG. 8 exemplifies the robot 20B according to the modification example of the first embodiment, and the robot 20B includes the pneumatic artificial muscles 101 as actuators. The robot 20B is a robot arm of three degrees of freedom, and has the first joint shaft 35-1, the second joint shaft 35-2, and a third joint shaft 35-3. The first joint shaft 35-1 rotates positively or negatively within the xy plane that includes the x axis and the y axis provided perpendicular to each other. The second joint shaft 35-2 and the third joint shaft 35-3 also rotate positively or negatively within the xy plane. FIG. 8 includes elastically expanding/contracting structures 101-1a, 101-1b, 101-2a, 101-2b, 101-3a, and 101-3b (these reference signs denote the individual elastically expanding/contracting structures, and an elastically expanding/contracting structure or a pneumatic artificial muscle is representatively denoted by reference sign 101).

Figure 9:
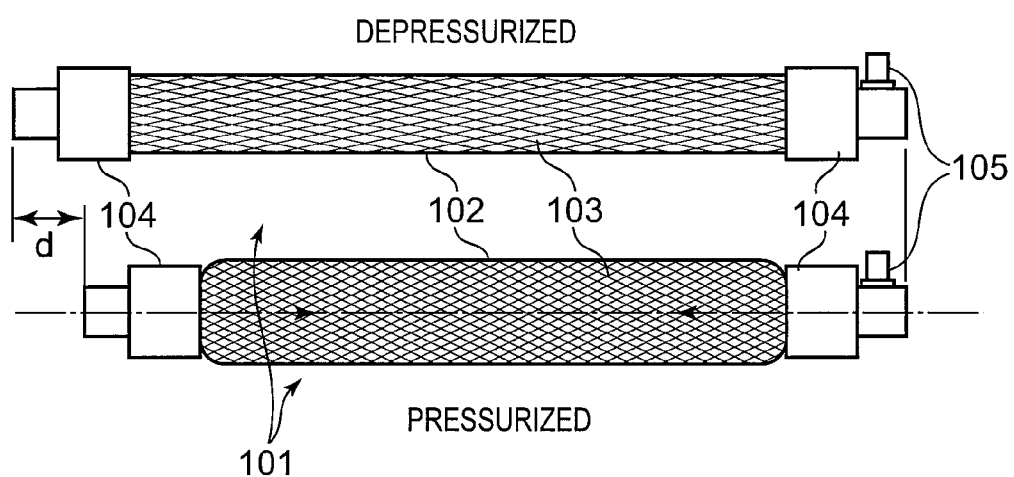
FIG. 9 is a view showing a configuration and motion of elastically expanding/contracting structures according to the first embodiment of the present disclosure.

As shown in FIG. 9, each of the elastically expanding/contracting structures 101 has a hollow elastic body 102 in a tube shape and a deformation direction restricting member 103. The tube elastic body 102 is composed of rubber and functions as a drive unit. The deformation direction restricting member 103 is provided on the outer surface of the tube elastic body 102 and includes mesh-shaped fiber codes made of resin or metal that is unlikely to be stretched. Radial deformation by expansion of the tube elastic body 102 is converted to contraction of the deformation direction restricting member 103 in length in the axial direction perpendicular to the radial direction. In contrast, radial deformation by contraction of the tube elastic body 102 is converted to expansion of the deformation direction restricting member 103 in length in the axial direction. The tube elastic body 102 has the respective ends airtightly sealed by sealing members 104. One of the sealing members 104 has a tube-shaped fluid passing member 5 that is provided therein with a fluid path allowing compressed fluid to pass therethrough, so that fluid can be injected into or discharged from the hollow portion in the hollow elastic body 2 through the fluid passing member 105. Compressed fluid such as air is thus supplied into the hollow tube elastic body 102 through the fluid passing member 105.

When the compressed fluid thus supplied applies internal pressure to the inner space of the tube elastic body 102, the tube elastic body 102 tends to expand mainly radially. This expansion is converted to motion of the tube elastic body 102 in the center axis direction by the function of the deformation direction restricting member 103 and the tube elastic body 102 is contracted in entire length. The tube elastic body 102 can be thus utilized as a linearly driven pneumatic artificial muscle.

With reference to FIG. 8 again, the robot 20 includes a set of elastically expanding/contracting structures 1 that is located to face each other at the support point of the joint shaft 35-1, 35-2, or 35-3. One of the set of elastically expanding/contracting structures 101 contracts whereas the other one of the elastically expanding/contracting structures 101 expands. Force is applied through the support point (the joint shaft 35-1, 35-2, or 35-3) and the joint shaft 35-1, 35-2, or 35-3 is rotated in an antagonistic drive structure, so that the joint shaft 35-1, 35-2, or 35-3 can be rotated positively or negatively. Specifically, the elastically expanding/contracting structures 101-1a and 101-1b are antagonistically driven and the first joint shaft 35-1 is thus driven to rotate positively or negatively. The elastically expanding/contracting structures 101-2a and 101-2b are antagonistically driven and the second joint shaft 35-2 is thus driven to rotate positively or negatively. The elastically expanding/contracting structures 101-3a and 101-3b are antagonistically driven and the third joint shaft 35-3 is thus driven to rotate positively or negatively.

A bar-shaped support member 116 has the lower end fixed to the floor 90 and the upper end rotatably supporting a support 119 that is rotatable concentrically with the first joint shaft 35-1. The lower end of the support member 116 has a fixed surface to which a bar-shaped support 118 extending perpendicularly to the longitudinal direction of the support member 116 is fixed. The ends of the elastically expanding/contracting structures 101-1a and 101-1b are rotatably coupled between the supports 119 and 118. The elastically expanding/contracting structures 101-1a and 101-1b are antagonistically driven and the support 119 is rotated positively or negatively within the xy plane about the first joint shaft 35-1. Thus, the first link 33 coupled to the support 119 has a first link support member (not shown) that is rotatable positively or negatively. The first link support member is fixed to the first link 33 as a bar-shaped member extending perpendicularly to the longitudinal direction of the first link 33 in a similar manner of fixing the support 118 to the support member 116. The first link 33 has the proximal end fixed to the support 119 together with the first link support member, so that the support 119, the first link 33, and the first link support member are rotatable integrally. The first link support member of the first link 33 is located and hidden behind the support 119 in FIG. 8 (not shown).

The second link 32 has the proximal end to which a second link support member 131 is fixed perpendicularly to the longitudinal direction of the second link 32. The second link support member 131 is rotatably coupled to the distal end of the first link 33. The ends of the elastically expanding/contracting structures 101-2a and 101-2b are rotatably coupled between the second link support member 131 and the first link support member.

The third link 31 has the proximal end to which a third link support member 132 is fixed perpendicularly to the longitudinal direction of the third link 31. The third link support member 132 is rotatably coupled to the distal end of the second link 32. The ends of the elastically expanding/contracting structures 101-3a and 101-3b are rotatably coupled between the third link support member 132 and the second link support member 131. The elastically expanding/contracting structures 101-3a and 101-3b are antagonistically driven and the third link 31, the third link support member 132, and the hand 22 are rotated positively or negatively within the xy plane about the third joint shaft 35-3.

Pressure sensors 109-1a and 109-1b measure internal pressure of the elastically expanding/contracting structures 101-1a and 101-1b, respectively. Specifically, the pressure sensors 109-1a and 109-1b are located at the fluid passing members 5 (fluid inlet/outlet ports) of the elastically expanding/contracting structures 101-1a and 101-1b, and measure internal pressure of the elastically expanding/contracting structures 101-1a and 101-1b, respectively. Similarly, the elastically expanding/contracting structures 101-2a, 101-2b, 101-3a, and 101-3b are provided with pressure sensors 109-2a, 109-2b, 109-3a, and 109-3b exemplifying internal state measuring units and function in similar manners, respectively (partially not shown).

The elastically expanding/contracting structures 101-1a and 101-1b, the elastically expanding/contracting structures 101-2a and 101-2b, and the elastically expanding/contracting structures 101-3a and 101-3b are connected with an air pressure source 125 through three-port flow rate proportional electromagnetic valves 127A and 127B and an air pressure regulating unit 126 (partially not shown).

The above configuration achieves basic functions of the robot 20B including the elastically expanding/contracting structures 101 as actuators.

According to the first embodiment, the robot 20 or 20B for conveying the object 30 in cooperation with the person 91 can safely hold the object 30 even when the robot arm 21 of the robot 20 or 20B is made in contact with the held object 30 in order to hold the object 30.

Particularly in the case where the actuator of the robot arm of the robot is elastic, when the person grips the robot arm of the robot with a hand of the person and applies force thereto, the elastic robot arm of the robot is actually located slightly in front of an original position of the robot arm of the robot. When the hand of the person releases the robot arm, the robot arm of the robot returns to the original position. Even if the suction pad at the distal end of the robot arm of the robot is made in contact with the object to be held and is stopped, the robot arm of the robot is shifted backward to form a gap between the suction pad and the object to be held when the hand of the person releases the robot arm. In this case, there has been the conventional problem that the suction pad fails to suck the object to be held.

In view of the above, the robot arm 21 of the robot 20 or 20B according to the first embodiment of the present disclosure temporarily stops when the contact detector 11 detects contact between the object 30 and the robot arm 21 of the robot 20 or 20B. The holding motion selecting unit 14 then appropriately selects one of continuously stopped motion, directionally limited motion, and directionally unlimited motion in accordance with the information including one or both of the distance between the robot arm 21 and the contacted object 30 and the force applied to the robot arm 21 by the person 91. The selected motion is performed by the force controller 12, so that the suction pad 22a of the hand 22 can reliably suck to hold the object 30 to be held.

The first embodiment exemplifies the robot arm 21 having the three shafts. The present disclosure is not limited to this case. Specifically, the number of shafts is not limited to the above. The technique of the first embodiment is not necessarily applied similarly to all the shafts but can be applied to a limited number of shafts.

The first embodiment describes the case where the holding motion selecting unit 14 selects in accordance with the contact condition information including both of the distance between the object 30 in contact with the robot arm 21 of the robot 20 and the hand 22 of the stopped robot 20 and the direction of force applied to the robot arm 21 of the robot 20 by the person 91. The present disclosure is not limited to this case but the contact condition information can alternatively include one of the above or different information.

The first embodiment describes the robot 20B including the pneumatic artificial muscles 101, and a desired position is displaced by force of the person 91. The present disclosure is not limited to this case but can be applicable to a flexible arm having a beam long enough to be warped by force of the person 91, a robot having an arm tip provided with a spring so as to have compliance, or the like.

Though the present disclosure has been described above based on the above first embodiment and modification examples, the present disclosure should not be limited to the above-described first embodiment and modification examples. For example, the present disclosure also includes the following cases.

Part or entirety of each of the above-described control apparatuses 50 is actually a computer system that includes, for example, a microprocessor, ROM, RAM, hard disk unit, display unit, keyboard, mouse, and the like. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the apparatus according to each of the above-mentioned embodiment and modification examples is a following program. That is to say, this program has a computer execute the sections (parts/units) defined in claims. The program has a computer execute the units/steps defined in claims. That is, such a program is a control program for a robot including a robot arm and configured to convey an object in cooperation with a person, the control program causing a computer to function as:

a contact detector configured to detect contact between a holder provided to the robot arm and the object when the holder holds the object;

a contact condition detector configured to detect a distance between the object and the holder as a contact condition upon contact;

a holding motion selecting unit configured to switch motion of the robot arm upon hold in accordance with the contact condition detected by the contact condition detector; and a motion controller configured to move the robot arm in accordance with force applied to the robot arm by the person, wherein the control program causes the computer to function such that, when the contact detector detects the contact, the robot arm temporarily stops and the holding motion selecting unit then selects one of continuously stopped motion, person associated motion with directional limitation, and person associated motion with no directional limitation in accordance with information including one or both of the distance between the robot arm and the contacted object and the force applied to the robot arm by the person, and the motion controller causes the selected motion to achieve holding motion.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment or modification example(s) of the aforementioned various embodiment and modification examples, the effects possessed by the embodiment or modification example(s) can be produced.

INDUSTRIAL APPLICABILITY

The robot, the robot control apparatus, the robot control method, and the robot control program according to the present disclosure are useful for position control such as control of a trajectory of a hand position of a robot arm holding an object. The present disclosure is applicable not only to the robot arm but also to an apparatus including a mechanism for holding an object in a production facility or the like, a control apparatus and a control method for the apparatus, and a control program therefor.

The entire disclosure of Japanese Patent Application No. 2013-034873 filed on Feb. 25, 2013, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A robot including a robot arm and configured to convey an object in cooperation with a person, the robot comprising:
a holder provided to the robot arm and configured to hold the object;
a contact detector configured to detect contact between the holder and the object;
a contact condition detector configured to detect a distance between the object and the holder as a contact condition upon contact;
a holding motion selecting unit configured to switch motion of the robot arm upon hold in accordance with the contact condition detected by the contact condition detector; and
a motion controller configured to move the robot arm in accordance with force applied to the robot arm by the person, wherein
when the contact detector detects the contact, the robot arm temporarily stops and the holding motion selecting unit then selects one of continuously stopped motion, directionally limited motion, and directionally unlimited motion in accordance with information including one or both of the distance between the robot arm and the contacted object and the force applied to the robot arm by the person, and the motion controller causes the selected motion to achieve holding motion.

2. The robot according to claim 1, wherein
the contact detector detects a direction of the contact between the robot arm and the object, and
only when the direction detected by the contact detector is equal to a direction of holding the object with the robot arm, the holding motion selecting unit selects the directionally limited motion or the directionally unlimited person associated motion in accordance with the information including one or both of the distance between the robot arm and the contacted object and the force applied to the robot arm by the person.

3. The robot according to claim 1, wherein
the contact detector detects a direction of the force applied to the robot arm by the person, and
the holding motion selecting unit selects the directionally limited motion when the direction detected by the contact detector is equal to an approaching direction in last approaching motion of the holder holding the object, and the holding motion selecting unit selects the directionally unlimited motion when the direction detected by the contact detector is not equal to the approaching direction in the last approaching motion of the holder holding the object.

4. The robot according to claim 2, wherein
the contact detector detects a direction of the force applied to the robot arm by the person, and
the holding motion selecting unit selects the directionally limited motion when the direction detected by the contact detector is equal to an approaching direction in last approaching motion of the holder holding the object, and the holding motion selecting unit selects the directionally unlimited motion when the direction detected by the contact detector is not equal to the approaching direction in the last approaching motion of the holder holding the object.

5. The robot according to claim 1, wherein, the holding motion selecting unit selects the directionally limited motion when the distance between the object and the holder detected by the contact condition detector is less than a threshold value, and the holding motion selecting unit selects the directionally unlimited motion when the distance between the object and the holder detected by the contact condition detector is equal to or more than the threshold value.

6. The robot according to claim 2, wherein, the holding motion selecting unit selects the directionally limited motion when the distance between the object and the holder detected by the contact condition detector is less than a threshold value, and the holding motion selecting unit selects the directionally unlimited motion when the distance between the object and the holder detected by the contact condition detector is equal to or more than the threshold value.

7. The robot according to claim 1, wherein the holder is a hand including a suction pad.

8. The robot according to claim 1, wherein the robot arm has an elastic configuration.

9. The robot according to claim 1, wherein the robot arm is an actuator including a pneumatic artificial muscle.

10. The robot according to claim 1, wherein, when the holding motion selecting unit selects the directionally limited motion, the holder moves only in an approaching direction in last approaching motion of the holder holding the object.

11. The robot according to claim 2, wherein, when the holding motion selecting unit selects the directionally limited motion, the holder moves only in an approaching direction in last approaching motion of the holder holding the object.

12. The robot according to claim 2, wherein the holding motion selecting unit determines that the robot arm is in the direction of holding the object when an angle between a direction perpendicular to a face of the holder of the robot arm facing the object and the direction detected by the contact detector is less than a threshold value in accordance with the contact condition detected by the contact condition detector and the direction detected by the contact detector.

13. The robot according to claim 3, wherein the holding motion selecting unit determines that the direction of the force applied to the robot arm by the person is equal to the approaching direction in the last approaching motion when a surface of the object facing the holder and a surface of the holder facing the object are approaching while an angle between a direction in which a point closest to the surface of the object facing the holder in the surface of the holder facing the object and the surface of the object facing the holder have a shortest distance and a perpendicular line to the surface of the holder facing the object is kept smaller than a threshold value, in accordance with the contact condition detected by the contact condition detector and the direction detected by the contact detector.

14. The robot according to claim 1, wherein, when the holding motion selecting unit selects the directionally unlimited motion, the robot arm moves in every movable direction.

15. A control apparatus for a robot including a robot arm and configured to convey an object in cooperation with a person, the control apparatus comprising:
   a contact detector configured to detect contact between a holder provided to the robot arm and the object when the holder holds the object;
   a contact condition detector configured to detect a distance between the object and the holder as a contact condition upon contact;
   a holding motion selecting unit configured to switch motion of the robot arm upon hold in accordance with the contact condition detected by the contact condition detector; and
   a motion controller configured to move the robot arm in accordance with force applied to the robot arm by the person, wherein
   when the contact detector detects the contact, the robot arm temporarily stops and the holding motion selecting unit then selects one of continuously stopped motion, person associated motion with directional limitation, and person associated motion with no directional limitation in accordance with information including one or both of the distance between the robot arm and the contacted object and the force applied to the robot arm by the person, and the motion controller causes the selected motion to achieve holding motion.

16. A method of controlling a robot including a robot arm and configured to convey an object in cooperation with a person, the method comprising:
   detecting, with a contact detector, contact between a holder provided to the robot arm and the object when the holder holds the object;
   detecting, with a contact condition detector, a distance between the object and the holder as a contact condition upon contact;
   switching, with a holding motion selecting unit, motion of the robot arm upon hold in accordance with the contact condition detected by the contact condition detector; and
   moving, with a motion controller, the robot arm in accordance with force applied to the robot arm by the person, wherein
   when the contact detector detects the contact, the robot arm temporarily stops and the holding motion selecting unit then selects one of continuously stopped motion, person associated motion with directional limitation, and person associated motion with no directional limitation in accordance with information including one or both of the distance between the robot arm and the contacted object and the force applied to the robot arm by the person, and the motion controller causes the selected motion to achieve holding motion.

\* \* \* \* \*